(12) United States Patent
Wookey et al.

(10) Patent No.: US 6,182,249 B1
(45) Date of Patent: *Jan. 30, 2001

(54) REMOTE ALERT MONITORING AND TREND ANALYSIS

(75) Inventors: Michael J. Wookey, Sunnyvale; Kevin L. Chu, Palo Alto, both of CA (US)

(73) Assignee: Sun Microsystems, Inc., Palo Alto, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/854,788
(22) Filed: May 12, 1997
(51) Int. Cl.⁷ .................................................... G06F 11/30
(52) U.S. Cl. ............................ 714/47; 714/57; 714/37; 714/40
(58) Field of Search .......................... 714/47, 57, 37, 714/38, 39, 40, 49, 46

(56) References Cited

U.S. PATENT DOCUMENTS

| | | | |
|---|---|---|---|
| 4,567,560 | 1/1986 | Polis et al. | 364/184 |
| 4,637,013 | 1/1987 | Nakamura | 370/85 |
| 4,709,365 | 11/1987 | Beale et al. | 371/11 |
| 5,101,402 | 3/1992 | Chiu et al. | 370/17 |
| 5,155,847 | 10/1992 | Kirouac et al. | 395/600 |
| 5,299,312 | 3/1994 | Rocco, Jr. | 395/200 |
| 5,307,354 | 4/1994 | Cramer et al. | 371/11.2 |
| 5,400,246 | 3/1995 | Wilson et al. | 364/146 |
| 5,471,399 | 11/1995 | Tanaka et al. | 364/491 |
| 5,487,169 | 1/1996 | Vraney et al. | 395/700 |
| 5,491,791 | 2/1996 | Glowny et al. | 395/183.13 |
| 5,495,610 | 2/1996 | Shing et al. | 395/600 |
| 5,539,869 | 7/1996 | Spoto et al. | 395/154 |
| 5,600,796 | 2/1997 | Okamura et al. | 395/200.11 |
| 5,655,081 | 8/1997 | Bonnell et al. | 395/200.32 |
| 5,668,944 | * 9/1997 | Berry | 395/184.01 |
| 5,696,486 | 12/1997 | Poliquin et al. | 340/506 |

(List continued on next page.)

OTHER PUBLICATIONS

Sun Microsystems, "Sun VTS 2.1 User's Guide", USA, Aug. 1997, Revision A.

"Remote Systems Diagnostics Installation & User Guide, Remote Systems Monitoring (SunReMon™), Remote Dial–in Analysis (SunRDA™)," Release 1.0.1, Sun Microsystems, Mountain View, California, Nov. 1996, (116 pages).

"Solstice™ SyMON™ User's Guide," Revision A, Sun Microsystems Computer Company, Mountain View, California, May 1996 (116 Pages).

Primary Examiner—Robert W. Beausoliel, Jr.
Assistant Examiner—Scott T. Baderman
(74) Attorney, Agent, or Firm—Skjerven Morrill MacPherson LLP

(57) ABSTRACT

A monitoring system generates alerts indicating predefined conditions exist in a computer system. Alerts are generated by comparing alert definitions to a host state representing the state of the hardware and software components of a computer system. to determine if conditions defined in the alert definitions exist in the host state; and generating alerts accordingly. The host state is a static tree structure including elements in a fixed hierarchical relationship, the elements being given value by associated tokens, the elements and associated tokens representing the hardware and software components of the computer system. The alert definitions generate alerts according to the values of at least one token, at least one alert or a combination of various tokens and/or alerts. The host state is created by providing a static tree structure representing a general computer system. Component information indicating hardware and software components of the computer system is extracted from diagnostic data of the computer system. The host state is generated according to the static tree structure and the component information.

20 Claims, 15 Drawing Sheets

U.S. PATENT DOCUMENTS

| | | | |
|---|---|---|---|
| 5,699,505 | 12/1997 | Srinivasan | 395/183.07 |
| 5,726,912 | 3/1998 | Krall, Jr. et al. | 364/550 |
| 5,727,144 | 3/1998 | Brady et al. | 395/182.04 |
| 5,751,964 | 5/1998 | Ordanic et al. | 395/200.54 |
| 5,758,071 | 5/1998 | Burgess et al. | 395/200.5 |
| 5,825,944 | * 10/1998 | Wang | 382/309 |
| 5,908,471 | 6/1999 | Lach et al. | 714/805 |
| 5,909,540 | 6/1999 | Carter et al. | 395/182.02 |
| 5,944,839 | 8/1999 | Isenberg | 714/26 |

* cited by examiner

- CRED Cache
- File Cache
- Streams Message
- Stream Head Cache
- Queue Cache
- SyncQ Cache
- Link Information Cache
- STREvent Cache
- Segment skip list cache
- anonymous cache
- anonymous map cache
- SegVN cache
- FLK Edges
- Snode Cache
- UFS Inode Cache
- FAS Cache
- PRNode Cache
- FNode Cache
- Pipe Cache
- RNode Cache
- RFS Proc control v2
- RFS Req control v2
- ACL Proc control v2
- ACL Req control v2
- ACL Proc Control v3
- ACL Req Control v3
- LM VNode
- LM Xprt
- LM sysid
- LM client
- LM async
- LM sleep
- LM config

*FIG. 7D*

| * Partition | Tag | Flags | Sector | Count | Sector | Mount Directory |
|---|---|---|---|---|---|---|
| c0t0d0s0 | 2 | 00 | 0 | 2048960 | 2048959 | / |
| c0t0d0s1 | 3 | 01 | 2048960 | 262960 | 2311919 | |
| c0t0d0s2 | 5 | 00 | 0 | 4154160 | 4154159 | |
| c0t0d0s7 | 8 | 00 | 2311920 | 1842240 | 4154159 | /export/home |

| * Partition | Tag | Flags | Sector | Count | Sector | Mount Directory |
|---|---|---|---|---|---|---|
| c0t1d0s0 | 2 | 00 | 0 | 62320 | 62319 | /c0t1d0s0.a005WN |
| c0t1d0s1 | 3 | 01 | 62320 | 197600 | 259913 | |
| c0t1d0s2 | 5 | 01 | 0 | 4154160 | 4154159 | |
| c0t1d0s0 | 4 | 00 | 259920 | 3894240 | 4154159 | /c0t1d0s6.a005WN |

FIG. 8

REMOTE ALERT MONITORING AND TREND ANALYSIS

CROSS-REFERENCE TO RELATED APPLICATIONS

This application relates to the following commonly owned co-pending applications, Ser. No. 08/819,501, entitled "AUTOMATIC REMOTE COMPUTER MONITORING SYSTEM", by Michael J. Wookey, filed Mar. 17, 1997, and Ser. No. 08/819,500, entitled "DYNAMIC TEST UPDATE IN A REMOTE COMPUTER MONITORING SYSTEM", by Michael J. Wookey, filed Mar. 17, 1997, Ser. No. 08/829,276, entitled "REBUILDING COMPUTER STATES REMOTELY", by Michael J. Wookey, filed Mar. 31, 1997, which applications are incorporated herein by reference.

BACKGROUND OF THE INVENTION

1. Field of the Invention

This invention relates to monitoring of computer systems and more particularly to monitoring the state of a computer system.

2. Description of the Related Art

Computer systems such as mainframes, minicomputers, workstations and personal computers, experience hardware and software failures that degrade system performance or render the system inoperative. In order to diagnose such failures computer systems include diagnostic capability which provides various types of system diagnostic information.

Computer systems are typically serviced when a failure is noticed either by system diagnostics or by users of the system when the system become partially or completely inoperative. Since computer systems are frequently located at some distance from the support engineers, when problems do occur, a support engineer may access the computer system remotely through a modem in an interactive manner to evaluate the state of the computer system. That remote dial-in approach does allow the support engineer to provide assistance to a remote customer without the delay of traveling to the computer system site. Once connected to the remote computer system, the support engineer can perform such tasks as analyzing hardware and software faults by checking patch status, analyzing messages file, checking configurations of add-on hardware, unbundled software, and networking products, uploading patches to the customer system in emergency situations, helping with problematic installs of additional software, running on-line diagnostics to help analyze hardware failures, copying files to or from customer system as needed.

However, there are limitations to such support. For instance, the data size transfer may be limited at the time of failure, due to such factors as modem speed and thus a complete picture of a system may be unavailable. Running diagnostic software during the remote session, if necessary, may adversely impact system performance. Where a system is part of a network, which is commonplace today, the running of diagnostic tests may impact network performance. Where computer systems are being used in a production or other realtime environment, such degradation of system performance is obviously undesirable.

Further, historical data on system performance is not be available in such scenarios. It is therefore impossible to analyze trends or compare system performance, e.g., before and after a new hardware of software change was made to the system. The support engineer is limited to the snapshot of the system based on the diagnostic information available when the support engineer dials in to the system.

It would be advantageous if a support engineer had available complete diagnostic information rather than just a snapshot, However, system diagnostic tests typically generate a significant amount of data and it can be difficult for a support engineer to analyze such data in a raw form. Additionally, service centers typically support a number of different computer systems. Each computer system has its own hardware and software components and thus have unique problems. For example, it is not uncommon for failures to be caused by incorrect or incompatible configuration of the various hardware and/or software components of the particular system. It would be advantageous to provide a remote monitoring diagnostic system that could process, present and manipulate diagnostic data in a structure and organized form and also monitor a number of different computer systems without having prior knowledge of the particular hardware or software configuration of each system being monitored. In order to provide better diagnostic support to computer systems, it would also be advantageous to provide the ability to detect problems in the diagnostic data and to provide proactive monitoring of the diagnostic data in order to better detect and/or predict system problems.

SUMMARY OF THE INVENTION

Accordingly, the present invention provides a method, apparatus and computer program products to generate alerts indicating predetermined conditions exist in a computer system. In one embodiment in accordance with the present invention, the method includes providing a host state representing a state of the computer system, comparing alert definitions to the host state to determine if conditions defined in the alert definitions exist in the host state; and generating alerts in response to the comparing of alert definitions. The host state is a static tree structure including elements in a fixed hierarchical relationship, the elements being given value by associated tokens, the elements and associated tokens representing the hardware and software components of the computer system. The alert definitions generate alerts according to the values of at least one token, at least one alert or a combination of various tokens and/or alerts. The host state is created by providing a static tree structure representing a general computer system. Component information indicating hardware and software components of the computer system is extracted from diagnostic data of the computer system. The host state is generated according to the static tree structure and the component information. The static tree structure includes element types in a fixed hierarchical relationship and the element types represent the hardware and software components of the computer system.

In another embodiment in accordance with the present invention, a monitoring computer system apparatus for generating alerts indicating predetermined conditions exist in a monitored computer system, includes a first data storage area storing a plurality of alert definitions defining respective predetermined conditions in the monitored computer system. A second data storage area stores at least a first host state of the monitored computer system, the first host state having associated token values indicating respective of software and hardware components of the monitored computer system. A monitoring computer is coupled to the first and second data storage areas and the monitoring computer generates alerts when a condition defined in one of the alert definitions is determined to be present in the first host state.

The method, apparatus and computer program products of the present invention provide a component based data structure for the diagnostic data that facilitates problem detection as well as proactive monitoring of the monitored computer system. Further, the present invention can build a representation of a monitored computer system without having any prior knowledge of the hardware and software details of the monitored computer system. Further, the invention can provide support for new computer systems and products in a manner that is more responsive than was previously available.

BRIEF DESCRIPTION OF THE DRAWINGS

The present invention may be better understood, and its numerous objects, features, and advantages made apparent to those skilled in the art by referencing the accompanying drawings, wherein the use of the same reference symbols in different drawings indicates similar or identical items.

FIG. 1b shows an exemplary monitored computer system which runs diagnostic tests on each computer and communicates the results of those tests to the system of FIG. 1a.

FIG. 7d shows operating system elements related to kernel statistics.

FIG. 8 shows an exemplary output of a diagnostic test from which tokens are extracted and used to instantiate the static model exemplified by FIGS. 3–6 and FIGS. 7a–7e.

DESCRIPTION OF THE PREFERRED EMBODIMENT(S)

Figure 1A:
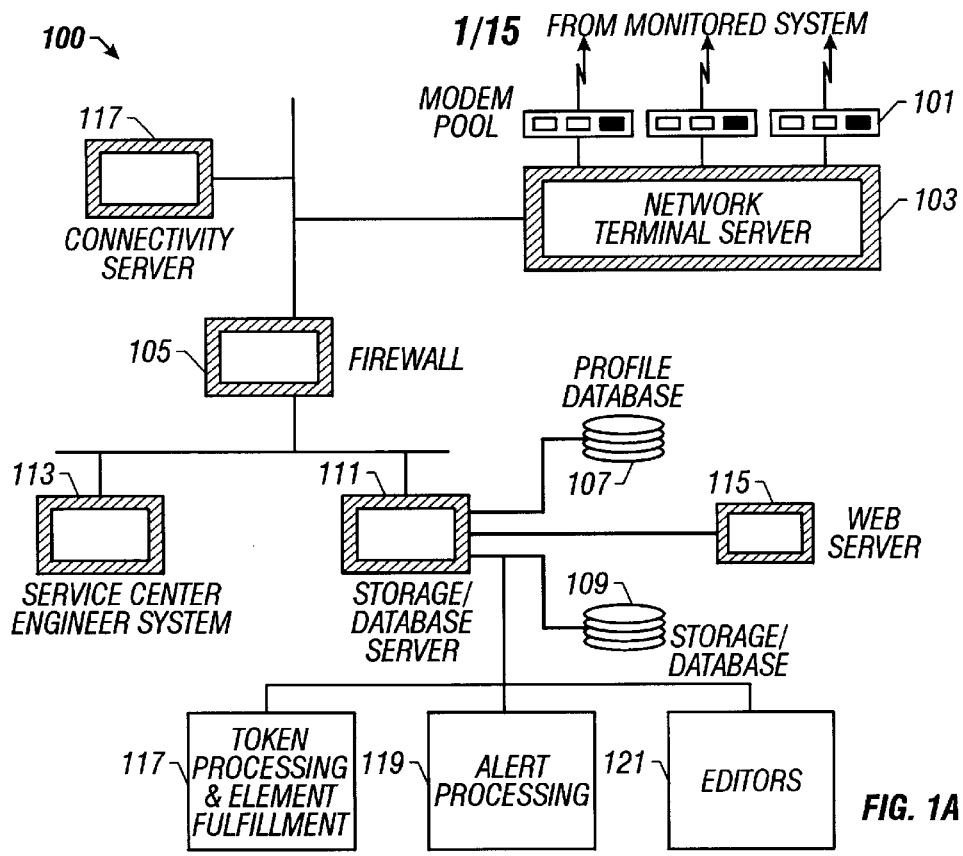
FIG. 1a shows an exemplary system for rebuilding the state of a computer according to the present invention.
Figure 1B:
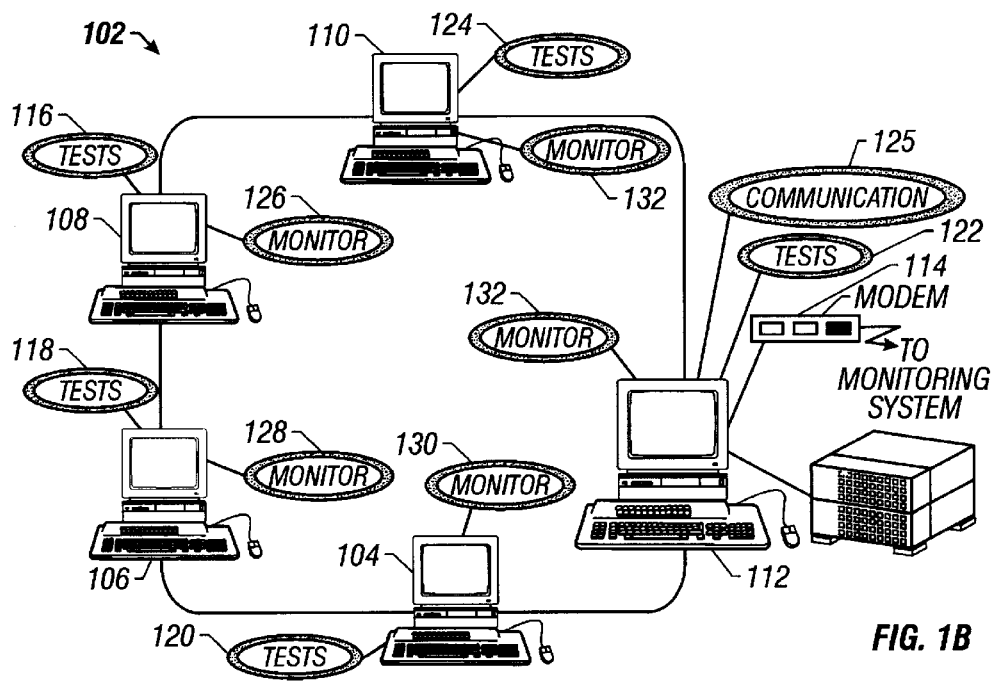

Referring to FIGS. 1a and 1b, an exemplary computer system 100, according to the present invention, receives diagnostic data from a monitored computer system 102. Monitored computer system 102 runs diagnostic tests, from among tests such as those shown in Table 1 or Table 2, on a periodic basis. The monitored system includes at least one computer and typically includes a plurality of computers 104, 106, 108, 110, and 112 coupled in a network as shown in FIG. 1b. The diagnostic tests 116, 118, 120, 122, and 124 are run on the computer system 102 under the control of monitor control software 126, 128, 130, 132, and 134. The results of those diagnostic tests are automatically provided at periodic intervals to the computer system 100 which monitors computer system 102. In exemplary computer system 100, which includes one or more computers and associated storage areas, preferably coupled in a network, incoming diagnostic data from monitored system 102 is received from modem 114 at one of the modems in the modem pool 101. The incoming data may be received via email or may be a direct modem connection to the monitored system 102 or may be received via other communication channels. The raw diagnostic data is stored in storage 109. Storage 109 is shown as a single storage unit but may be separate storage units to accommodate the various storage requirements described herein. In order to perform operations on the data received, processor 117 transforms the received incoming data into a structure which can then be analyzed by alert processing computer 119. Editing capability is provided by a separate computer 121. Note that the functions may be performed in separate machines or may be combined into one or several computers.

TABLE 1

| Class | Test Name | Description |
|---|---|---|
| network | automount.files | Automount/etc Files |
| | automount.nis+ | Automount NIS+ Files |
| | automount.nis | Automount NIS Files |
| | dfshares | NFS shared filesystems |
| | domainname | Domain name |
| | etc.defaultdomain | /etc/defaultdomain |
| | etc.defaultrouter | /etc/defaultrouter |
| | etc.dfstab | List/etc/dfs/dfstab |
| | etc.hostnames | /etc/hostname(s) |
| | etc.hosts | /etc/hosts |
| | etc.mnttab | List/etc/mnttab |
| | etc.named.boot | /etc/named.boot |
| | etc.nsswitch.conf | /etc/nsswitch.conf |
| | etc.resolv.conf | /etc/resolv.conf |
| | netstat-an | List all TCP connecfions |
| | netstat-in | List network interfaces |
| | netstat-k | Network interface low-level statistics |
| | netstat-rn | List network routing |
| | nisdefaults | NIS+ server defaults |
| | nisstat | NIS+ statistics |
| | ypwhich | NIS server name |
| | ypwhich-m | NIS map information |
| OS | checkcore | Check for core files |
| | df | Disk Usage |
| | dmesg | Boot Messages |
| | framebuffer | Default console/framebuffer |
| | hostid | Numeric ID of host |
| | ifconfig | Ethernet/IP configuration |
| | messages | System messages (/var/adm/messages) |
| | patches | List system patches |
| | pkginfo | Software package information |
| | prtconf | System hardware configuration (Software Nodes) |
| | prtconf-p | System hardware configuration (PROM Nodes) |
| | prtdiag | Print diagnostics (Sun-4d systems only) |
| | sar | System activity reporter |
| | share | Shared directories |
| | showrev | Machine and software revision information |
| | swap | Swap report |
| | uptime | Local uptime and load average |

TABLE 1-continued

| Class | Test Name | Description |
|---|---|---|
| | whatami | Lengthy system description report |
| unbundled | fddi-nf_stat | FDDI low-level statistics |
| | metastat | Online DiskSuite or Solstice DiskSuite |
| | vxprint | Systems using SPARCstorage Array Volume Manager |
| | x25_stat | X.25 low-level statistics |

TABLE 2

| Test Name | Test Name |
|---|---|
| ps -ef | ypwhich |
| pkginfo -1 | df |
| vmstat | df -k |
| showrev -a | mount -v |
| xdpyinfo | more/etc/dfs/dfstab |
| netstat -k | cachefsstat |
| kmemleak (SMCC) | df -1 |
| vtsprobe | df -1k |
| modinfo | showrev -p |
| arp -a | nettest -1v (VTS) |
| netstat -r | dmesg |
| configd | diskprobe |
| more/etc/mail/sendmail.cf | disktest -1v (VTS) |
| crontab -1 (as root) | tapetest -1v (VTS) |
| more/etc/nsswitch.conf | bpptest -1v (VTS) |
| more/etc/resolv.conf | uname -a |
| niscat -o org_dir | |

Figures 2, 2A:
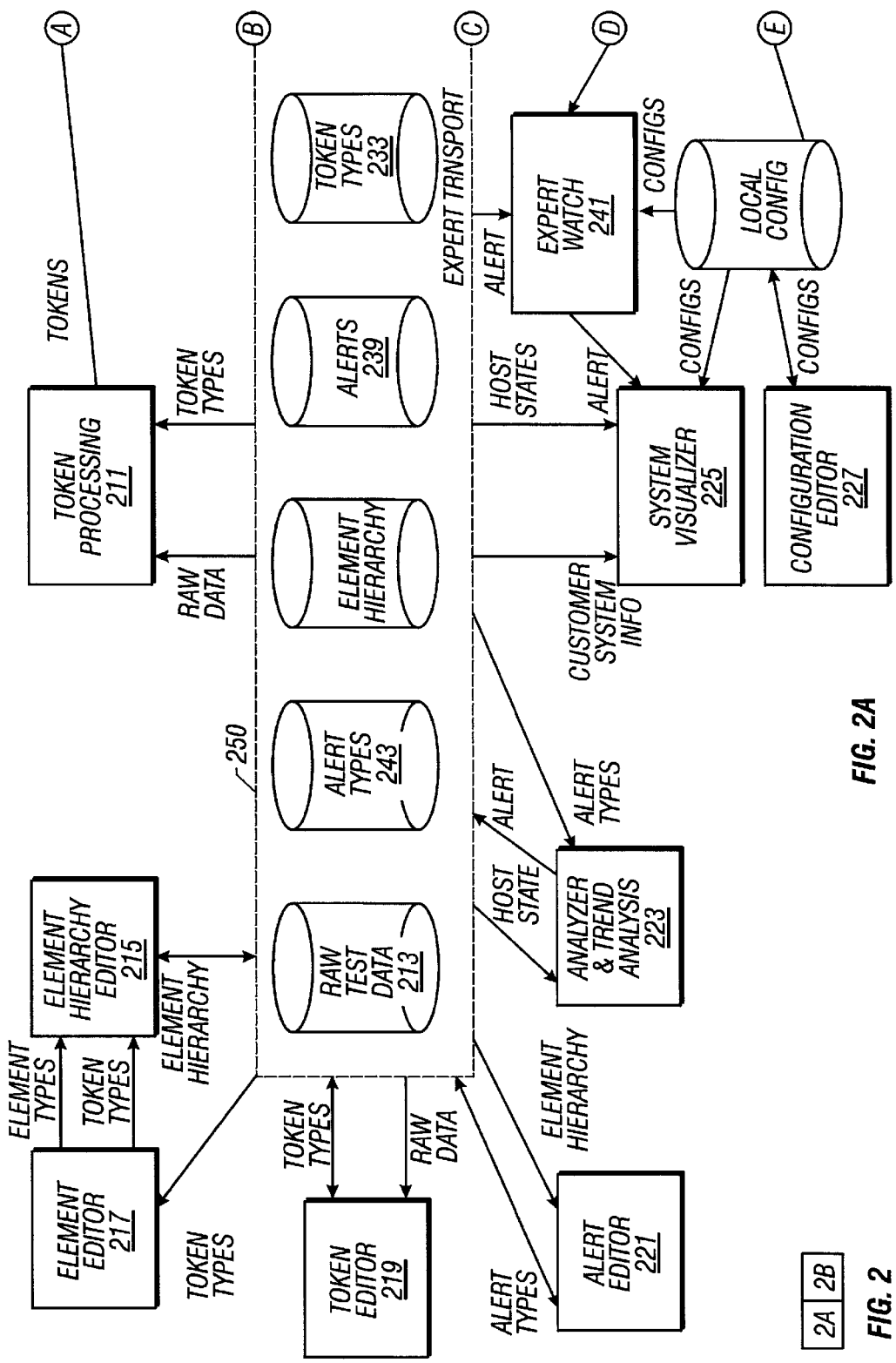
FIG. 2 details the architecture of a system that rebuilds computer states according to the present invention.
Figure 2B:
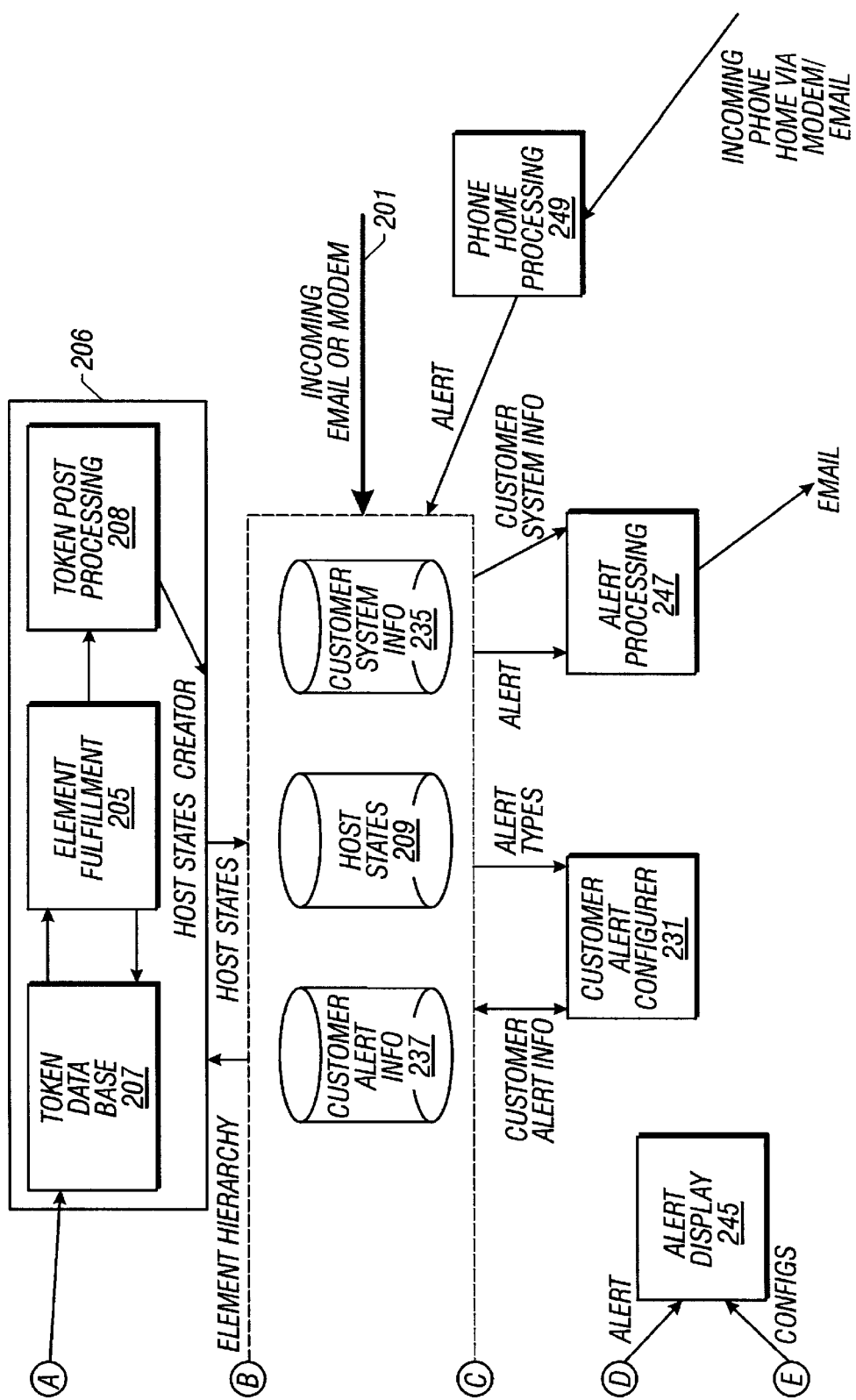

Referring to FIG. 2, the architecture of a system according to the present invention, is shown in greater detail. Incoming diagnostic data 201 is received via email or direct modem link (or another communication link) into the monitoring system and stored in raw test data storage area 213. The test data, which contains information about the software and hardware components in monitored system 102, is processed by token processing 211 to extract the information associated with hardware and software components in the monitored system. The extracted information is then used to create a representation of the monitored system in host state creator 206 based on the component information. The host state is the state of the monitored system or one computer of the monitored system over the particular time period that the diagnostic tests were run. Further details of the host state will be described further herein.

In order to create a representation of the monitored system, the components contained in the test data are built into a system hierarchy based on a static hierarchy tree definition. In a preferred embodiment, one static hierarchy tree definition is applicable to all systems which are being monitored. The extracted information about the components in the monitored system are mapped onto the static tree to create the system representation for the monitored system. Thus, the state of the monitored system is rebuilt.

The hierarchy tree is composed of elements. An elements can be thought of as a physical or virtual component of a computer system. For example, a computer system may include such components as a disk, a disk partition, a software package, and a patch. An element has tokens associated with it. Thus, a partition element may have a disk percentage token, disk name token, and space available token associated with it. An element definition includes what token types fulfill the element, and give the element value. In one embodiment, an element is an instance of a class of elements types as implemented in an object oriented language such as the JAVA programming language (JAVA™ and JAVA-based trademarks are trademarks or registered trademarks of Sun Microsystems, Inc. in the United States and other countries.).

Figure 3:
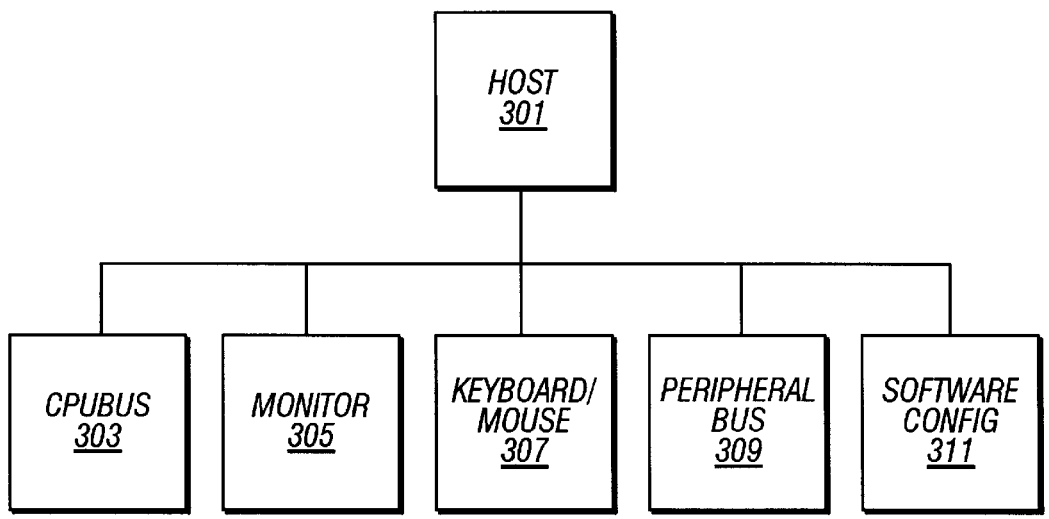
FIG. 3 shows a root and lower branches of a static tree definition of computer system.
Figure 4:
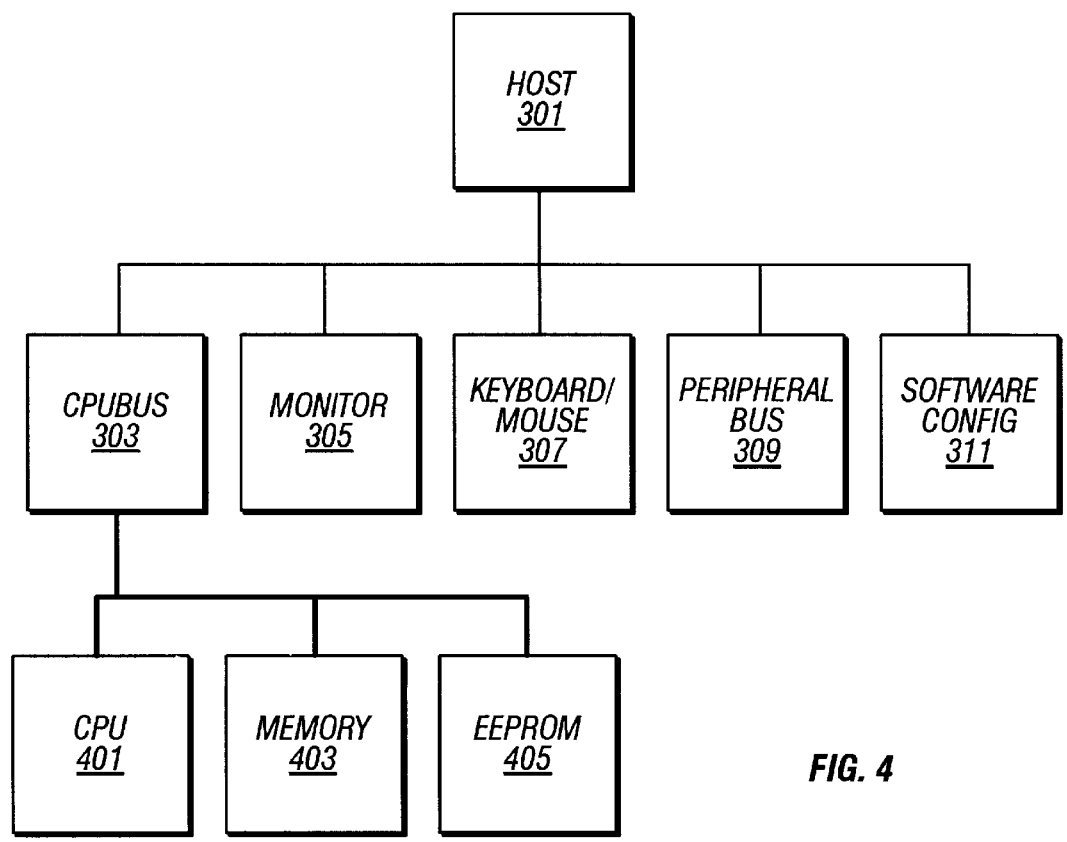
FIG. 4 shows additional branches of a static tree definition of a computer system relates to components of the CPU-BUS.
Figure 5:
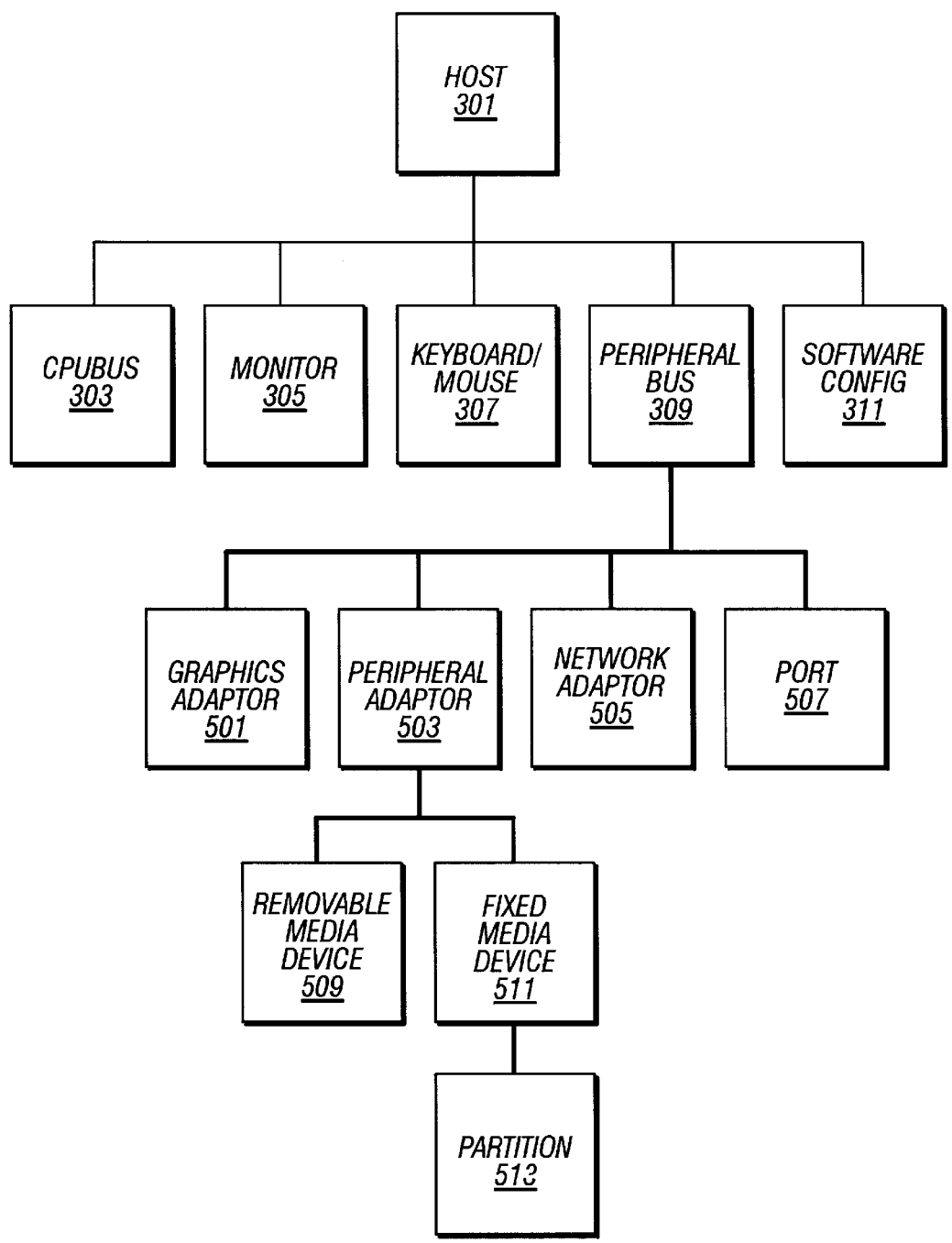
FIG. 5 shows additional branches of a static tree definition of a computer system, related to components on the peripheral bus.
Figure 6:
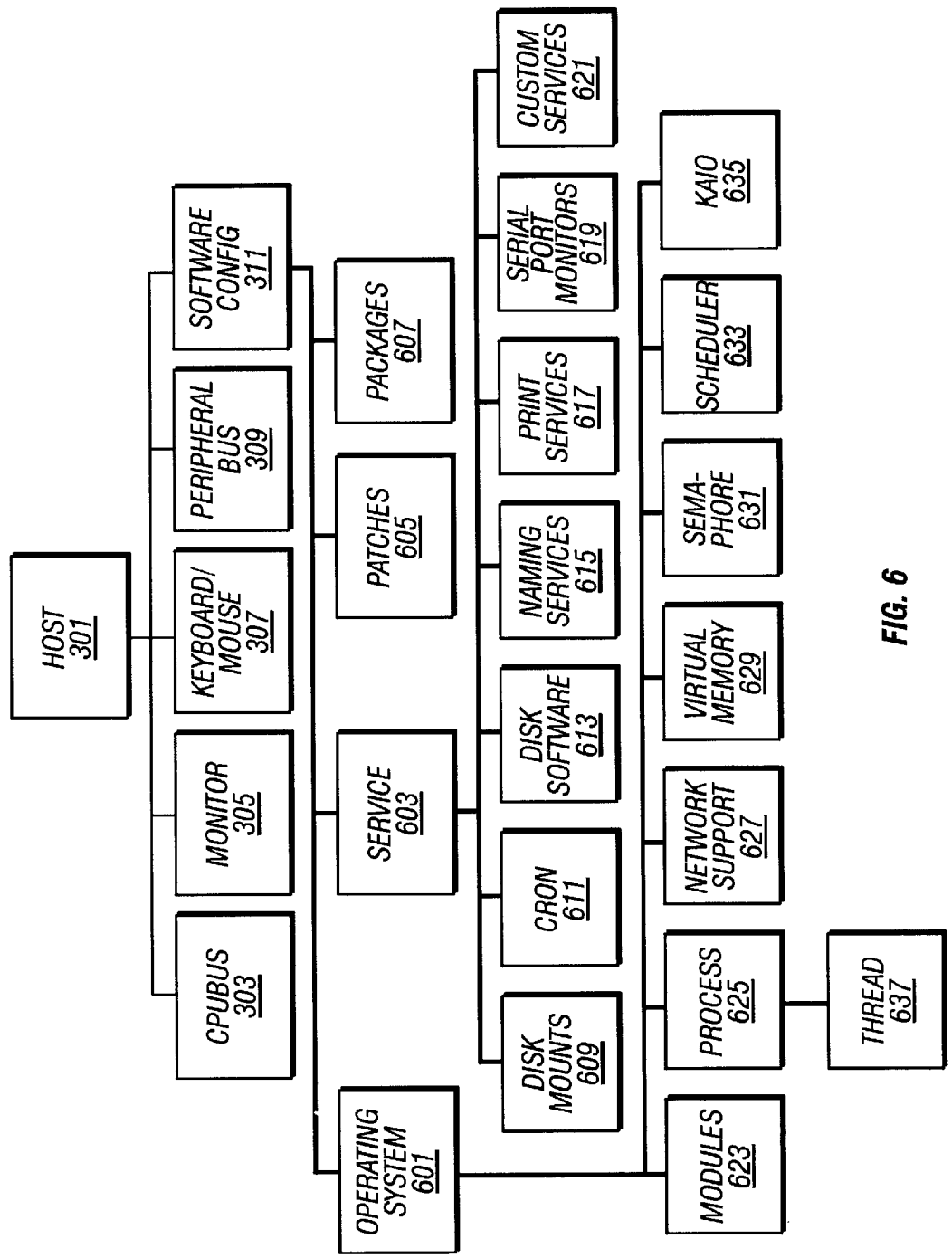
FIG. 6 shows additional branches of a static tree definition of a computer system, related to software configuration components.
Figure 7A:
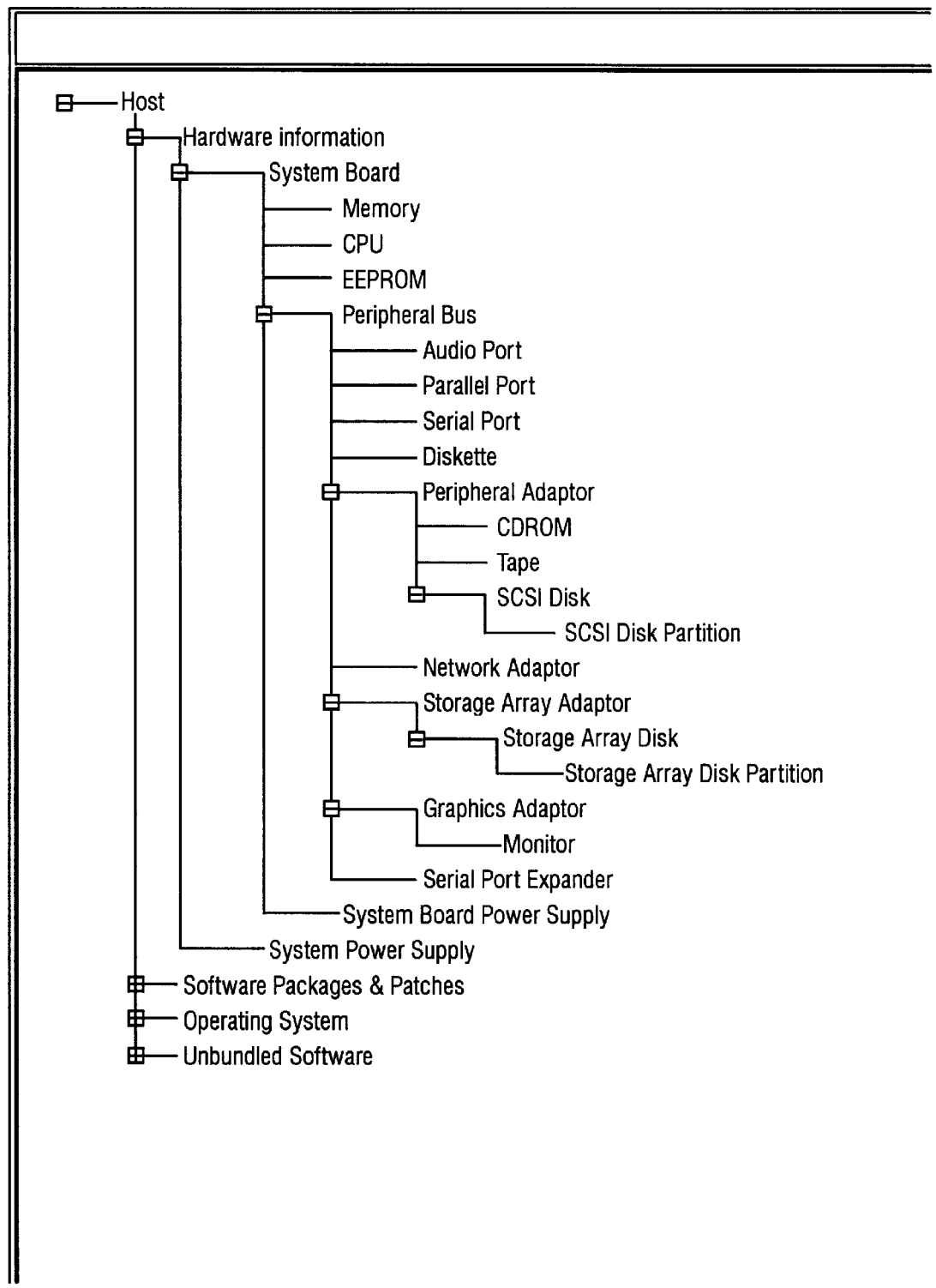
FIG. 7a shows the root and lower branches of a second exemplary tree structure.
Figure 7B:
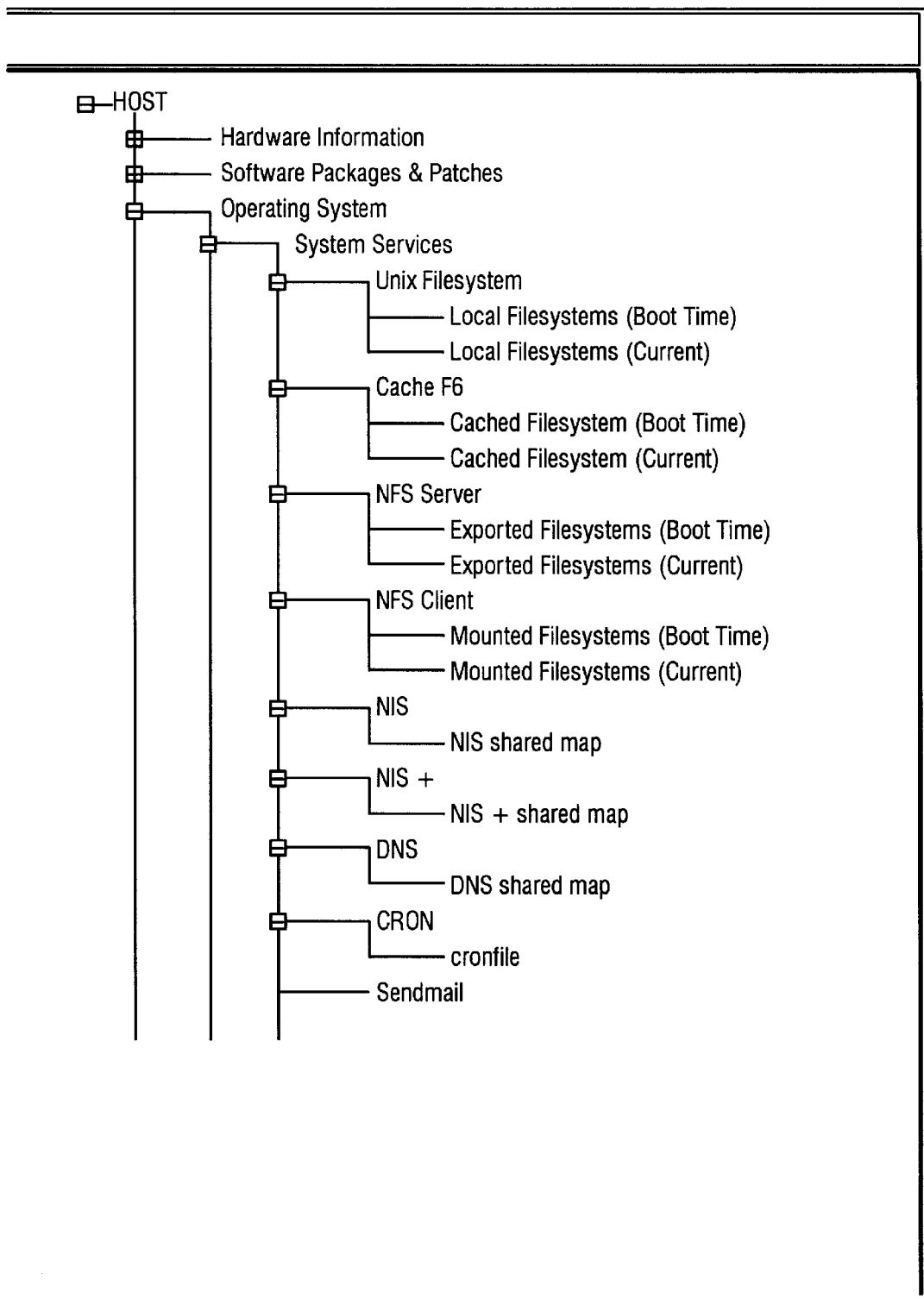
FIG. 7b shows additional sub elements of the System services element.
Figure 7C:
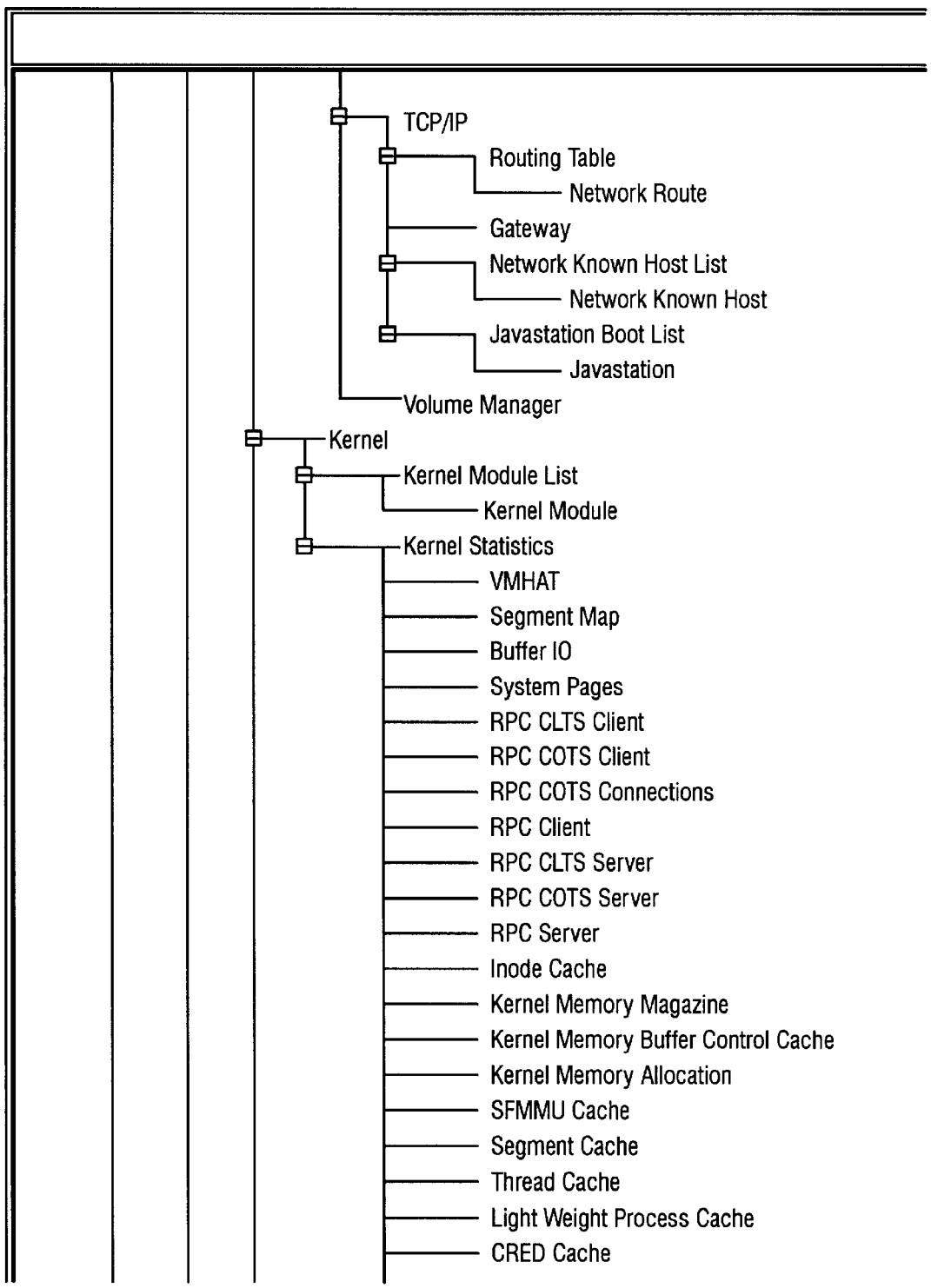
FIG. 7c shows additional operating system elements.
Figure 7E:
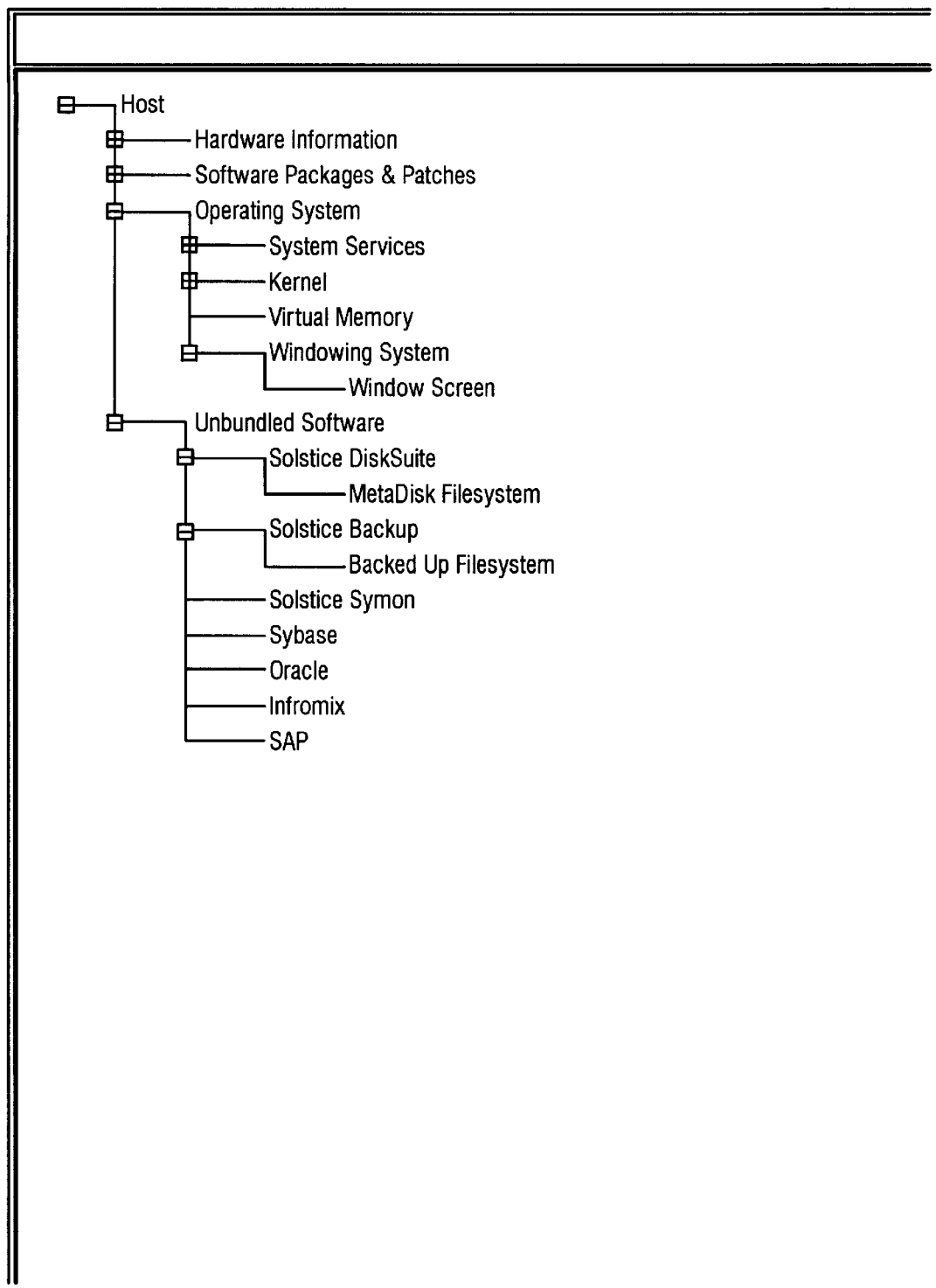
FIG. 7e shows unbundled software elements.

An exemplary portion of a static tree definition a computer system is shown in FIGS. 3–6. FIG. 3 shows a lower level (closer to the root) elements of the static tree and FIGS. 4, 5, and 6 show how the tree definition expands. The element host 301 defines the kind of computer that is being monitored. For instance, the host may be a Sun workstation running a Solaris™ operating system (Solaris and Sun are trademarks or registered trademarks of Sun Microsystems, Inc., in the United States and other countries.) or a PC running a Windows NT operating system. Attached to hose 201 are other physical or virtual components such as CPU bus 303, monitor 305, keyboard/mouse 307, peripheral bus 309 and software configuration 311. Note that the terms are very general. Each element represents types of components that can be found in a typical computer system.

Referring to FIG. 4, the computer system further includes additional physical or virtual components on the CPU bus 303. The additional elements found on the CPU bus include CPU 401, memory 403 and EEProm 405. Referring to FIG. 5, additional components of the static hierarchy tree definition of the computer system can be found under peripheral bus element 309. Note that the instance of the peripheral bus could be an Sbus. However, the instance could also be a Peripheral Component Interface (PCI) bus. In fact there could be two instances of peripheral bus, e.g. SBUS and PCF bus. In some instances there could be more than two peripheral buses. The additional elements found on peripheral bus 309 include display adapter 501, peripheral adapter 503, network adapter 505 and port 507. The peripheral adapter element 503 may be coupled to additional elements such as removable media device elements 509, (e.g., a disk drive, tape or CD drive) or a fixed media device 511. The fixed media device may be a hard disk drive which can have a further virtual component, partition elements 513. Note the general nature of the static hierarchy system definition. That allows the static definition to be used even for monitored systems that utilize different software and hardware components.

Referring to FIG. 6, additional software elements under the software configuration element 311 are shown. Included in the software configuration 311 are the operating system element 601, software services element 603, patches element 605 and packages element 607. Additional elements under software services include disk mounts 609, cron 611, disk software 613, naming services 615, print services 617, serial port monitors 619 and custom services 621. The packages elements 607 indicate, e.g., what software has been installed on the system. The operating system 601 is further defined by elements 623–637.

The description of the static tree is exemplary. Another tree may be chosen according to the system being monitored. Additionally, the static tree may be modified to reflect hardware and software enhancements to computer systems. The hierarchy tree definition is static in that it does not vary according to the system being monitored. However, the hierarchy tree can be edited in element hierarchy editor 215 to accommodate additions and/or deletions from the hierarchy tree when for instance, a new technology begins to be utilized in the monitored computer systems. One static tree or hierarchy tree definition may be sufficient for most or all monitored systems. However, a hierarchy tree definition could be tailored to the type of computer system that is being monitored to e.g., enhance processing speed. Another exemplary tree structure is shown in FIGS. 7a–7e. The tree structure can be seen to include both hardware components and software components.

Thus, given a static definition of a generic computer system such as shown in FIGS. 3–6, or FIGS. 7a–7e. it is possible to build a representation of the actual computer system being monitored utilizing the diagnostic data communicated from the monitored system to the monitoring system.

In order to extract information from the diagnostic data stream, "token types" are utilized. A token type defines each token to have a token name and a test name. A test name comes from the tests shown e.g., in Table 1 or in Table 2, and indicates which test output contains the information for the token. In addition to a token name and a test name, each token has a label and a value. The label for the token gives the token knowledge about what element the token is associated with, i.e., the parent of the token which is an element. The value of the token provides a value extracted from the diagnostic data that gives value to the element.

For instance, assume a disk element exists with a name of "c0t10d0". Assume also that a token exists for such a disk element indicating the number of sectors per cylinder. The name of such a token would be, e.g., "number of sectors per cylinder." The test name in the token would be "vtsprobe" since the output of that test provides the information needed for the number of sectors per cylinder. The label for the token would be "c0t10d0" indicating that token is associated with a particular disk having that name. Finally, the token would have a value which indicates the number of sectors per cylinder. Other tokens could of course be associated with that element. For example, another token associated with that disk element might be a disk manufacturer token that identifies the manufacturer as "Seagate". The value of the token in such an instance would be "Seagate".

Note that one token type can create many tokens from the test data. For example, a "disk name" token type could extract multiple tokens, e.g. the disk names "c0t1d0" and "c0t2d0", from the test data when a particular system has two disks so named.

There are two types of tokens. The first is an element realizing token. Element realizing tokens provide a way to determine whether an element should be included when building a particular host state. For example, a disk name token is an element realizing token. The second type of token are data tokens which provide additional information about an element that has already been realized, such as the token indicating the number of sector per cylinder. Thus, it can be seen that tokens give value to the elements.

For any particular system, it is preferable to create tokens with as much granularity as possible. Thus, the smallest piece of information that is available about a system from the available diagnostic tests should be included as a token. Representative tokens are included in the description herein. The exact nature of the tokens and the total number of tokens will depend upon the system that is being monitored, including its hardware and operating system, and the diagnostic tests that can be run on the system. Table 3, attached, shows both elements and tokens for an exemplary embodiment of the invention. For each element shown in Table 3, the associated tokens are shown as well as the tests that supply the token information. In addition Table 3 shows the types of computers and operating system releases on which the tests are operable.

An exemplary output of one the diagnostic tests is shown in FIG. 8. The processing must extract from the output such information as the disk partition ID, last sector, first sector and the like. Examples of the tokens that are extracted for disk partition elements is shown in Table 3 for tokens associated with "SCSI Disk Partition Element". In order to parse through the output of the diagnostic tests a strong textual processing programming language, such as Perl, is utilized.

Note that the preferred implementation of the invention described herein is in an object oriented computer language and more particularly in JAVA. Nearly all the classes and type definitions described herein extend the type Persistent Object. Persistence is a technique that can be used in object oriented programming to ensure that all memory resident information can be stored to disk at any time. It can be through of as encoding and decoding. When a persistent object is saved to disk, It is encoded in some manner so that it may be efficiently stored in the appropriate medium. Equally when loading the information back, it is decoded. That allows complex memory structures to be stored easily in databases with minimum disk space impact.

Now that it is understood that a static tree structure is composed of elements which are realized and given value by tokens, the building of a particular representation of a monitored computer system can be more completely described. Referring again to FIG. 2, the incoming data stream 201 of diagnostic data is stored in raw test data storage area 213. Token types are stored in storage area 233. The token types and the diagnostic data are provided to token processing 211, which is the process of running the token definitions against the incoming data and generating an outgoing stream of tokens which are stored in token data base 207. In a preferred embodiment the tokens in token data base 207 are stored as a hashtable to provide faster access to subsequent processing steps of building the representation of the system. A hashtable is a common key/element pair storage mechanism. Thus, for the token hashtable, the key to access a location in the hashtable is the token name and the element of the key/element pair would be the token value. Note that because the diagnostic data may include data for multiple computers in a monitored network or subnetwork, one task is to separate the diagnostic data provided to the token processing process 211 according to the computer on which the diagnostic tests were executed. Token types are run against the test output indicated in the test name in the token. For example token types having a test name parameter of "df" are run against "df" test output.

Once all the raw test data has been processed and a completed token data base 207 is available, the second set of processing operations to build the representation of the monitored computer may be completed. In order to understand the building of the tree, an examination of several typical features of an element class will provide insight into how an element is used to build a tree.

An element has methods to retrieve the name of the element as well as the various values associated with an element. For example, a disk element includes a method to retrieve a disk ID token which realizes the element as well as having a method to find in the token data base a disk capacity parameter, sectors per track and other tokens such as those shown in Table 3 associated with "SCSI Disk". Those parameters are used to realize a disk element and give it value.

An element of one type is similar to an element of another type. For example, a partition element requires different tokens to provide different values but otherwise is similar to a disk element. The tokens needed to provide value to the partition element may include partition size, partitions used and partition free. Note elements have associated tokens providing a name or ID. As previously described, tokens have both a value and a label. The label or name provides a "tie" for the token. Suppose a disk element is instanced with a name of "c0t1d0". One of its token to be fulfilled is disk size. The token that provides the disk size would have a name of "c0t1d0" and a value of 1.2 Gb. The value of 1.2 Gb would be tied to the name "c0t1d0".

Figure 9:
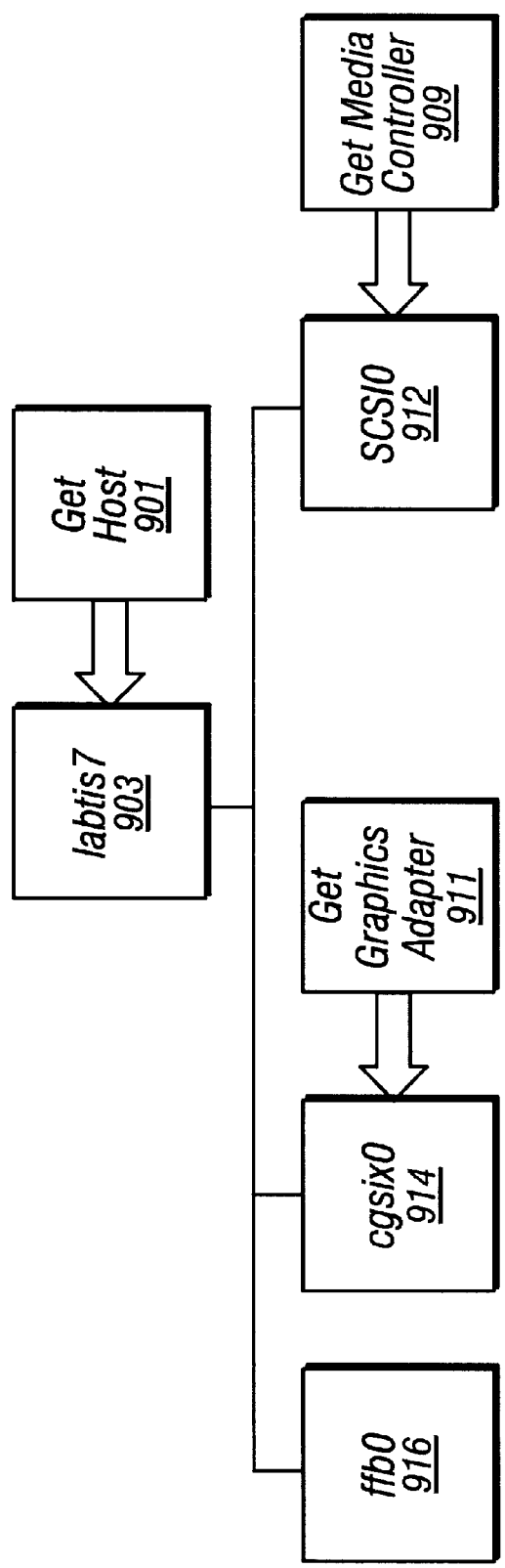
FIG. 9 shows an exemplary instantiation of a portion of a static tree.

Referring to FIG. 9, an example of building a host state based on the elements of the static tree is shown. The term "host state" refers to the representation of the monitored system based on its diagnostic data. The host state essentially describes the state of a system for a given time period. The host state may be viewed as an instantiated element hierarchy based on the raw data that has come in from the remote host. In other words, it is a completed element hierarchy with value. The diagnostic data is collected over a particular time period, so the host state represents the state of the monitored machine over that particular time period, e.g., an hour. The host state is built by starting from the top of the tree element host 301. The element 301 has methods to retrieve relevant tokens from the token data base 207. As shown in FIG. 9, the element 301 is realized with Get Host 901 as "labtis 7" 903. Because the token data base is a hashtable in the preferred embodiment, the realization of each element is faster. Next element graphics adapter 501 gets (911) graphics adapter cgsix0 914 and ffb0 916. Continuing to build the host state, media controller element gets (909) SCSI0 912 from the data base. In a preferred embodiment, the host state is built in depth order meaning that each element and all branches of that element are built before another element is built. Thus, referring back to FIG. 5, for example, everything on peripheral bus 309 would be built before the building of the software configuration 311. For each element in the static tree, the token data base is searched and the host state is created in element fulfillment processing 205 which requests tokens from token data base 207 in the form of searches for tokens providing realization and value to the static tree.

Once the element fulfillment stage is completed a final token post processing operation takes place in 208. An element can have a token defined that is the mathematical result of other tokens. For example, a disk space free token is derived from a simple subtraction from a disk used token and a total disk space token. The calculations are completed in this post processing operation 208 to complete the host state.

Note that because the tree definition is static and is intended to be general, not all elements will be found in every host state. Thus, when building the host state, no data will be found in the token data base for a particular element that is lacking in the monitored system. Additionally, in some host states, an element will be found more than once. Thus, the tree structure provides the flexibility to build host states that look very different.

Once the host state is built, it is saved in host state storage 209. The storage of the host state provides several advantages. For one, it provides the capability to search back through time and to compare one host state with another host state from a different time or perform trend analysis over time. The host states may be stored for nay amount of time for which adequate storage area is available. For example, host states may be stored for a year.

Additionally, the stored host states are used when the diagnostic data is incomplete. There may be occasions when a test has failed to run in the monitored system or has not run before a scheduled communication of data from the monitored system. That may cause problems in the building of the host state from the static tree, especially where the test was one that created elements lower in the tree (i.e. towards the root). Each element can include a value that indicates how critical the element is to the system. If the element is critical, such as a disk, there could be a problem with the system and it should be noticed. If the data is not critical to the system, then older data could be retrieved from the previous host state in time for that particular host. That could be limited by restricting such retrieval to a specified number of times, e.g., 10, or any other number appropriate to the criticality of the element, before marking data as invalid.

Referring again to FIG. 2, the expert transport 250 provides access to all of the data storage mediums used for the various processes requiring the storage mediums. The communications between processing and storage elements is preferably network based to allow flexibility in implementation as the load of the subsystems may be distributed across machines if need be. Each module can access the expert transport in a very rigid manner making use of the object orientated design facilities provided by JAVA.

Figure 10:
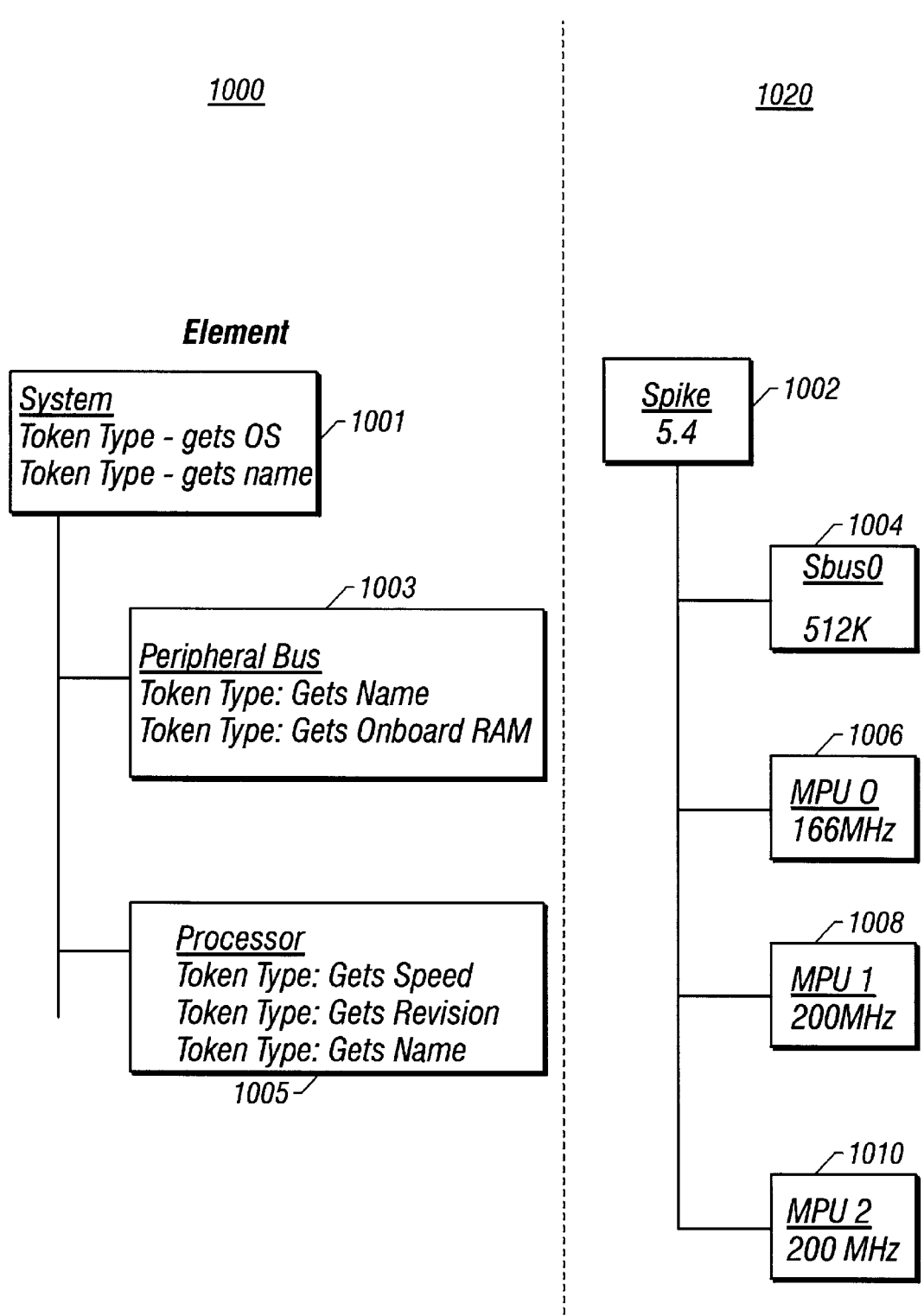
FIG. 10 shows another example of a tree structure and an instantiation of that tree.

A second example of building a host state is shown in FIG. 10. Element 1001 has associated token types for the name of the system and the OS. Peripheral bus element 1003 has associated token types which gets the name of the peripheral/bus and any onboard RAM. Element 1005, which is a processor element, has associated token types to provide a name, a revision number and the processor speed. The static definition 1000 creates a host state 1020 where the system is realized as "Spike" with an OS release of 5.4. The peripheral bus is instantiated as Sbus0 with 512 K of RAM. The processor element is instantiated three times as MPU0 1006, MPU1 1008 and MPU2 1010. Thus, an example is provided where a single element is realized more than one time in a particular system.

Figure 11:
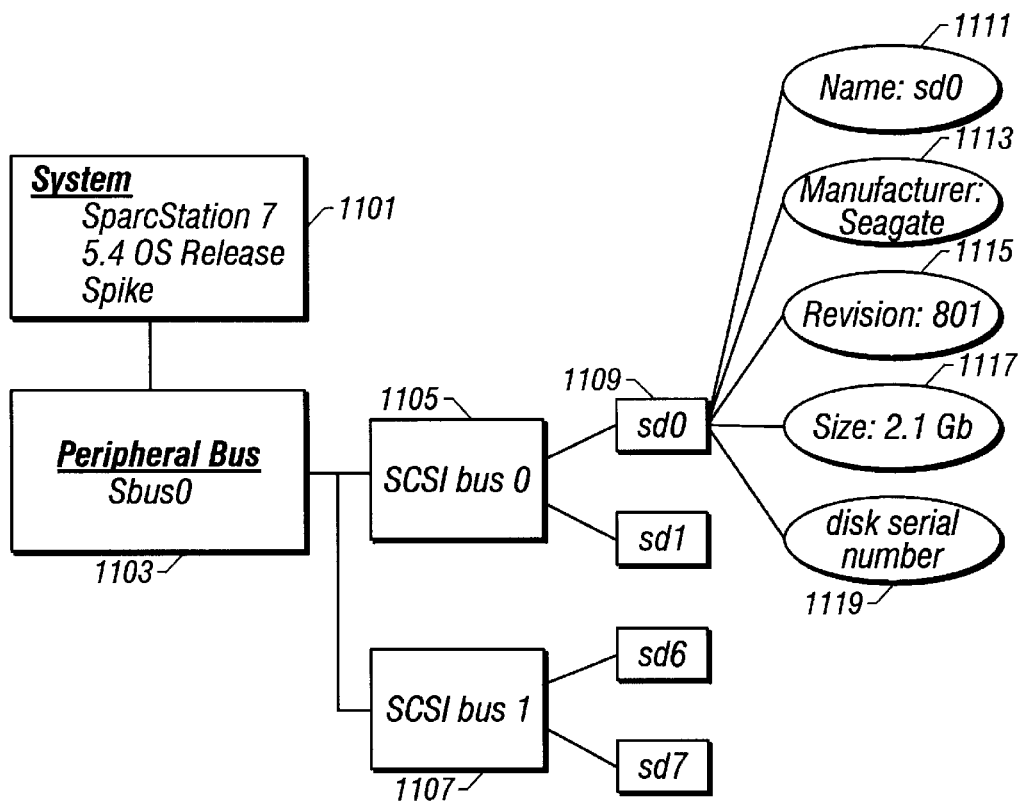
FIG. 11 shows another example of a host state.

Referring to FIG. 11, another example of a host state is provided. The system is shown as element 1101 with associated values of being SparcStation2, with a system name Spike and an OS 5.4 release. All SPARC trademarks are used under license and are trademarks or registered trademarks of SPARC International, Inc., in the United State and outer countries. Products bearing SPARC trademarks are based upon an architecture developed by Sun Microsystems, Inc. The system has a peripheral bus, Sbus0, which has two SCSI buses 1105 and 1107. Attached on SCSI bus 0 are two disks sd0 and sd1. Disk "sd0" has associated tokens, in addition to its name, the manufacturer 1113, the revision 1115, the size of the disk, 1117 and the serial number 1119. As seen in Table 3, for the SCSI disk element, other tokens may be associated with a disk element.

Figure 12:
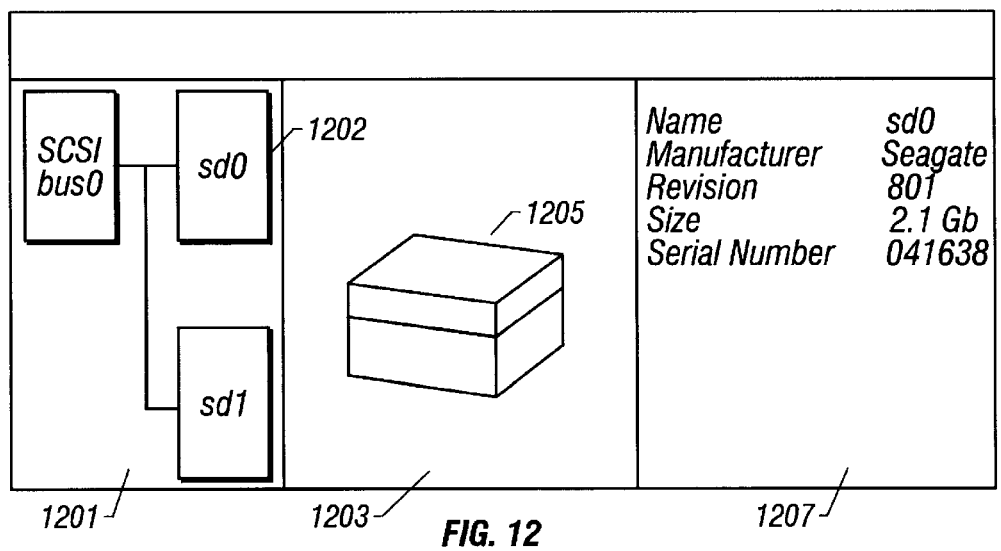
FIG. 12 shows how the host state can be displayed to show graphical, and attribute information about the host state.

In addition to storing the host state in data base 209, the system provides a graphical interface to access information about the host state. Referring to FIG. 12, an exemplary system visualization screen is shown. The tree structure is provided in region 1201 of the screen which graphically represents a portion of the host state shown in FIG. 11. Tree structures may also be represented in the form shown in FIGS. 7a–7e or other appropriate form. In addition to displaying the tree structure which provides the user a graphical depiction of the completed element hierarchy for a particular system at a particular time, the screen also provides a graphic image of the particular component which is being viewed. For instance, region 1203 of the screen shows a graphic image 1205 of a disk. Assuming that the viewer had clicked on disk 1202, sd0, region 1207 shows the attributes or token values associated with the selected element. Thus, the attributes relating to name, manufacturer, revision, size and serial number are all provided. This presents the support engineer with an easily understandable graphical image of the total system, and any particular component of the system that is represented in the host state, along with pertinent attributes.

Referring again to FIG. 2, the system visualizer 225 receives host states from host states database 209 and customer system information stored in data base 235. The system visualizer also receives alerts and local configurations relevant to a particular support engineer. The first task that the system visualizer must be to select the particular host that is to be worked upon or viewed. Thus, the system visualizer will have to search the host states database 209. The visualizer will provide the ability to parse through time to select from all the host states available for a particular system. While each element may have a graphic associated with it, a separate graphic can be used to indicate that a problem exists with a particular element.

In addition to displaying the attributes of an element, which are the values of the tokens associated with the element, the system visualizer provides graphical capability to graph attributes against time. One or more attributes can be selected to be graphed against history. In other words, the same attributes from different instances of the element hierarchy for a particular system can be compared graphically. For example, the amount of disk free over time can be monitored by looking at outputs of the "dt" test over a period of time. The df output includes such token values as disk percentage used for a particular partition, partition name and size of partition. The visualizer will extract the tokens representing amount of disk percentage used for a particular set of host states. The host states from which the disk percentage tokens are extracted is determined according to the time period to be viewed. That information can then be visualized by plotting a graph of disk percentage used against time. Also, the visualizer can view different instances of the host state. In other words, the visualizer can view the state of a monitored system at different times. That capability provides a visual interpretation of changes in system configuration. The visualizer accesses the stored multiple instances of the host state of the particular system to provide that capability.

While it is possible for the diagnostic data from the monitored system to come up to the monitoring system in a raw form, it is also possible to do some preprocessing on the data in the monitored system. The preprocessing could translate the diagnostic data to something more easily readable by the monitoring system. As a simple example, the monitored system could eliminate all white space in the test output. The choice of whether to do preprocessing may depend on such considerations as whether the additional load put on the monitored system is a cost that is outweighed by the benefit of simple processing at the monitoring system.

Once host states have been created, the data can be analyzed for the presence of alerts. Alerts are predefined conditions in the various components of the monitored computer system that indicate operating conditions within the system. The alerts are designed to be sufficiently flexible so that they can detect not only serious problems, but also detect performance and misconfiguration problems. Different levels of severity may be provided in each alert. For example, alert severity can range from one to six. Severity level six indicates effectively that the system has gone down while severity level of one indicates that here could be a performance problem in the system.

Two types of alerts are available. The first kind of alert is a spot alert which is based on current data only. A spot alert indicates that a particular value of a system component has exceeded a threshold value. For example, a spot alert could result when the number of parity errors exceeds a predetermined threshold, or when the root partition of a disk exceeds 99%. A patch configuration problem provides another example of a spot alert. For example, assume the patch configuration problem exists for a particular patch in a particular OS release. If a host state contains the token indicating the presence of the particular patch as well as the token indicating the particular OS release, an alert would be issued.

The second type of alert is a predictive alert. A predictive alert analyzes historical and current data to identify trends. In other words, the predictive alert is a form of trend analysis. Storing multiple instances of stored host states in the host state data base, makes possible such trend analysis of the operating conditions of a monitored system. Trend analysis allows pro-active detection of undesirable conditions in the collected diagnostic data. For example, trend analysis identifies that the number of memory parity errors is increasing, even though the number is not yet fatal. The alert can generate the probability that the increase will eventually result in a fatal error. Another example of a predictive alert is memory leak detection.

Trend analysis compares the value of a current alert to previous alert results. The trend is determined by comparing, e.g., tokens continuing the number of parity errors of a memory element, over a sequence of host states. Trend analysis may use alerts saved from a previous analysis or may obtain relevant token values from saved host states or may operate on both saved tokens from earlier host states as well as saved alert values.

Note that trend analysis may be utilized to detect a build up of data indicating an increasing number of parity errors over a period of time and can flag the problem before the spot alert was generated. Similarly, the trend analysis can detect increasing disk usage and predict the problem before the threshold of 99% is reached. It can be seen that trend analysis is really analysis performed on the results of spot alerts over time.

A spot alert provides the basic analysis type. The spot alert allows components to be tested against alert types stored in database 243. Alert types define an alert in a manner similar to a token type defining a token. The alert types define the details of the alert and how to process it. Consider an alert to determine if a particular partition has exceeded a predetermined percentage used. The tokens utilized in processing the alert include a token for the partition name, e.g., /var. A second token utilized is partition percentage used. The alert determines if partition name=/var AND percentage used $\geq 80\%$. When those two conditions are true, the alert is raised. That is a simple spot alert.

As an example of a predictive alert consider an alert that predicts whether or not swap space is going to get low on the system. The token value used is one that identifies swap-space used. An operator that is useful in predictive analysis is one called, OverTimeOperator, that provides the value of swap space used over time, i.e., from sequential host states. One can specify how far back the OverTimeOperator should go in retrieving token values from previous host states. The spot test of such a token determines if in the latest data, the swap space used is over 90%. That is the first gating factor of the alert. Then the alert uses that spot test data and the data from the OverTimeOperator and provides the data to a normalization function which provides a graphical analysis of the data. If the angle of normalization is greater than 52 degrees, an alert is generated thereby predicting that swap space is going to get low on the system. The particular angle selected as a trigger may depend on such factors as the system being monitored and the normalization function.

An exemplary alert definition is shown below which detects a probable swap space problem. In the example, the "OverTimeOperator" retrieves the swap spaced used tokens for the last 48 hours. The swap space used token are retrieved into var1 which is a vector or list of all swap spaced used tokens. Var2 is a vector of vectors which includes var1. Var2 is provided because in one embodiment, the compare operator may operate on more than two things. The result determines if swap spaced used tokens have been greater than 90% over the last 48 hours.

Vector var1=OverTimeOperator.dbGet ("token:Swap Used", currentTime, current Time—48*3600);
// input for var2
Vector var2input0=new Vector ( );
var2input0.addElement (var1);
Integer var2=((Integer) var2Input0);
Integer var0=new Integer ("constant:int 90");
AlertRes res=GreaterThanOperator.compare (var2, var0);

In one embodiment, the alert definitions are run against the host states using alert functions. The code for each alert definition is not actually stored in the Alert function. Instead, the JAVA code for the alert definition is sent by the alert editor to a file repository, e.g., 243 from the compiler. A reference to the compiled alert definition is then stored in the Alert Function which is stored in a database, e.g. database 109 as shown in FIG. 1. An exemplary AlertFunction class is shown below.

```
Class AlertFunction
{
    String AlertFunction         // reference to actual javacode
    String Name;
```

| | | |
|---|---|---|
| Vector CustomersApplicable; | | // vector of customers Alert<br>// function is run on. If<br>// Empty run on all |
| Weight wgt; | | // tells it what the values<br>// of the function output mean |

}

Thus, an Alertfunction object will exist for each alert definition, the object pointing to the location where the alert definition actually is stored. The Alertfunction object will be run against the host state (or states) as appropriate.

In one embodiment, there are five possible output severitys, red, yellow, blue, black, green. Weight creates a range mapping onto some or all of these severitys. For instance, if a particular alert returns a number between 1 and 100, a level of between 1 and 20 could be mapped onto red. Similarly, for an alert that returns a value of true or false, a true value can be mapped onto, e.g., red. For each new host state, the alert processor retrieves all of the alert functions. Each alert function points to the associated compiled alert code and in this way all of the alert definitions are parsed against the host state.

When alerts are created, that is when the alert definitions pointed to by the alert functions, are found to exist in a particular host state(s), then an alert object in accordance with an alert class is created. An exemplary alert class is as follows:

```
public class Alert
extends NamedObject
implements Cloneable, Persistence, DatabaseDefinition {
    Alert Status      status;          // red,blue,green,yellow
    ElemementDef      elementDef;      // eg disk, cpu
    Element           element;         // instance of element
    AlertFunction     function;        // the function that compute this
                                       // alert, eg check swap space
    boolean           isHandled;       // anyone acknowledged it?
    ExpertUser        user;            // who acknowledged it
    String            soNumber;        // service order # if one was
                                       // logged by RX
    String            date;
    String            description;     // human readable description, filled
                                       // in from a printf type template
    Customer          customer_id;     // uniquely identifies customer site
    String            customerOrgName; // company etc
    String            customerSite;    // company etc
    CustomerHost      customerHost;    // the specific host
    String            customerContact; // name of a person, usually a sys admin
    String            customerPhoneNo; // that person's phone number
    int severity;                      // severity level
}
```

Each of the fields above are filled in by either the output value of the AlertFunction or information relevant to the customer that is obtained from the incoming diagnostic data.

Alert types use the element hierarchy as their base and can be tied to the tree definition for visualization purposes. For instance, if an alert is generated for a disk capacity of a partition, the alert visualizer would graphically represent the partition to facilitate ease of understanding for the service engineer.

In a preferred embodiment, alert definitions are processed on each host state after it is generated. Each alert type is compared to a host state and an output is generated. That is, the tokens contained in the host state are compared to the condition defined in the alert type. An alert editor 221 allows alert types to be defined through an editor. An alert, which is an instantiation of a particular alert type, can have an associated severity level as previously described.

An alert may be based on other alerts. That is, an alert type can take either the input from one or more token types or a mixture of other alerts and token types. Therefore a complex alert structure can created before a final alert value is determined. An alert editor 221 provides the ability to create alert types. The alert editor can create the JAVA code to represent the alerts. If the alert type is a fairly rigid structure, the creation of JAVA code is facilitated.

The alert types are related to the element hierarchy. The alert type to test the disk capacity of a partition, as described previously, utilizes tokens related to the partition element in the element hierarchy. That alert works fine for all partitions. In accordance with the model discussed in the element and element hierarchy, only one alert would exist for all partitions created, so all partitions that exist on all disks would have the alert processed when a host state is created.

The alert types, as can be seen from the description of alerts herein, support basic logic tests. As another example, consider an overall test of virtual memory. That may require a disk space alert run on the /tmp partition. For example there may be a /tmp disk space alert, that would be defined upon the global partition, to specify this the alert type would have a logic test to see if the attached token parameter was equal to "/tmp".

There are various operators which are utilized to define the alerts. The operators are in the general sense functions that operate on the token types contained in the host states. Exemplary operators include logical operators, AND, OR, NOT, XOR, BIT-AND, BIT-OR, BIT-NOT, BIT-XOR, arithmetic operators, SUM, SUBTRACT, MULTIPLY, DIVIDE, relational operators, LESS THAN, LESS THAN OR EQUAL, GREATER THAN, GREATER THAN OR EQUAL, EQUALS, NOT EQUALS. There are also set operators, UNION, INTERSECTION, ELEMENT OF, (element of is checking if the particular value is an element of a set), DIFFERENCE BETWEEN 2 SETS. String operators include, STRING LENGTH, STRING-SUBSTRING (to see if the string you have is actually a substring of the original string), STRING-TOKEN, (to see if this particular string is a token of the bigger string). Conversion operators convert, HEXADECIMAL TO DECIMAL, HEXADECIMAL TO OCTAL, HEXADECIMAL TO BINARY. Additional operators are, AVERAGE, MEAN, STANDARD DEVIATION, PERCENTAGE CHANGE, SLOPE (which is based on graphing a straight line interpolation of plots), SECOND ORDER SLOPE, CURVE EXPONENT (map an exponent algorithm on the actual curve), MAX, and MIN, for the maximum and minimum value, ALL OF TYPE (extracts all the values of a certain type out of a host state), ALL OVER TIME (obtains a range of data for a token over a period of time), EXIST, (checks to see if token exists), WEIGHT, (applies a certain weight to a value), NORMALIZE. Some embodiments may also provide for custom operators. Other operators may be utilized in addition to or in place of those described above.

Once the alerts have been defined and stored in alert types database 243, the alerts have to be run against the host states. Whenever a host state is crated the alert and trend analysis is run against the host state. Thus, the alert types and a host state are provided to analyzer 223. The analyzer processes the alerts by running the JAVA code definition of the alerts against the host state(s). The alert types may be associated with particular elements so that an entire tree structure does not have to be searched for each alert type. If an alert is generated, alert data base 239 stores the value of the alert. Storing the alerts in a database allows for later retrieval.

Alerts can focus on several major areas of a system operations. Typical areas of interest include patch management, performance monitoring, hardware revision, resource maintenance, software problems, general configurations and hardware failures. Patch management alerts detect if patches are missing on systems that require the patch to correct known hardware or software problems. Performance monitoring and system configuration alerts ensure that the system is configured appropriately to maximize performance. Hardware revision alerts detect when hardware is out of date or a known problem exists with a particular hardware revision. Resource maintenance, e.g., alerts related to swap space, identify when a resource is going to or has run low. Software failure alerts identify known symptoms of software failures. General configuration errors identify system configuration errors that can adversely affect system performance. In addition, hardware failures are also an area of focus for alerts.

In one embodiment of the invention, all alert types are global in that the alert types are run against all monitored systems, i.e., the host state representation of that system, in a default mode. However, the tests can be selectively enabled (or disabled) according to the monitored system. Such capability is provided in the embodiment shown in customer alert configurer 231 which, in a preferred embodiment, is a JAVA based GUI which provides the ability to select which alerts should run on particular monitored systems from a list of all the alerts available. Note that it is not essential that each system being monitored have the alerts match their actual hardware and software configuration. If an alert has no input the alert will be marked as invalid. Consider, for example, a disk mirroring alert. If the host state does not show that any disk mirroring exists on the host, then the disk mirroring alert would be invalid and ignored by the system. Thus, alerts that reference elements or token parameters not found in a particular host state are marked as invalid and ignored.

Note that the design of the alert system is intended to mirror a support engineers thought process. That is, when presented a problem, a number of system conditions would be checked for existence or correctness, a weighted judgment would be given after each investigation, eventually the final prognosis would be given.

In addition to generating the alerts, the existence of the alerts is communicated to, e.g., a support engineer. Referring to FIG. 2, several features are provided to support the engineer responsible for a particular monitored system. For instance, in order to provide the information to a support engineer, one embodiment of the invention utilizes a JAVA Graphical Users Interface (GUI) application to display the alerts in alert display 245. In this embodiment the GUI provides the support engineer with a number options for displaying alerts. For example, the GUI can, in one embodiment, display a list of all alerts that have arisen and have not been dealt with. The GUI could also provide the capability to perform various operations on a list of alerts, such as to filter the list by priority, customer and type of alert. The GUI could also allow the engineer to focus on certain customers, ignoring others. It will use personal configurations for the engineer that have been created through the configuration editor to access this functionality.

A configuration editor 227 stores engineer specific information about the system visualizer and the alert viewer. The configuration editor allows configuration of various aspects, such as which other remote monitoring sites (e.g., in other countries) the visualizer and alert viewer are to communicate with, as well as which monitored computer systems the engineer is responsible for. The configuration editor will also allow the engineer to define which applications start up by default.

The alert viewer can thus provide a scrolling list of alerts for customers specified by the local configuration file. The alert viewer displays such information as alert priority, customer name, alert type, host machine; time passed since alert raised. Color may also be used to distinguish varying levels of alert importance.

The support engineer also has a background task operating, the expert watch 241, which in a UNIX embodiment is a daemon process that runs on the engineer's machine. Expert watch 241 monitors incoming alerts generated in alert analyzer 223 and when the expert watch 241 matches an alert type and customer with the engineer's own configuration profile, it will notify the engineer and cause the system visualizer to display the problem system at the point in the hierarchy where the problem exists. The problem would be shown graphically. If the system visualizer was not running, the expert watch daemon could case the system visualizer to start.

Alerts can be generated in another fashion other than the alert analyzer 223, specifically phone home processing. Phone home processing is when a serious problem occurs on a monitored system requiring immediate attention, and the monitored system immediately contacts the service center via dial up modem or email and the like. Phone home processing 249 converts the incoming phone home messages into alerts. The alerts are then dealt as high priority alerts through the system. The alerts can be viewed by the alert viewer and/or emails are sent to the appropriate email addresses In addition to notifying service engineers by displaying alerts, the alert processing in 247 may also generate email. A database such as the profile database 107 shown in FIG. 1 may include email addresses associated with particular monitored systems. When an alert of a predetermined seriousness occurs, an email is sent to the appropriate email addresses.

The description of the invention set forth herein is illustrative, and is not intended to limit the scope of the invention as set forth in the following claims. For instance, while exemplary embodiments were described in terms computers operating in a UNIX environment, the invention is also applicable to various computers utilizing other operating system and any time of processors and software. In light of the full scope of equivalence of the following claims, variations and modifications of the embodiments disclosed herein, may be made based on the description set forth herein, without departing from the scope and spirit of the invention as set forth in the following claims.

TABLE 3

| Element | Element Entries Token Type | Server Legacy 5.4 | Server Legacy 5.5 | Server 5.5.1 | Server Enterprise 5.6 | Desktop Legacy 5.4 | Desktop Legacy 5.5 | Desktop 5.5.1 | Desktop >= Ultra 2 5.6 |
|---|---|---|---|---|---|---|---|---|---|
| Host | Hostname | uname-a | showrev-a | showrev-a | | uname-a | showrev-a | showrev-a | |
| | Platform | | uname-a | uname-a | | | uname-a | uname-a | |
| | Host Id | | showrev-a | showrev-a | | | showrev-a | showrev-a | |
| | Serial Number | ReMon Extract | ReMon Extract | configd | | ReMon Extract | ReMon Extract | configd | |
| | Data Date | ReMon Extract | ReMon Extract | ReMon Extract | ReMon Extract | ReMon Extract | ReMon Extract | ReMon Extract | ReMon Extract |
| | OS Release | | showrev-a | showrev-a | | | showrev-a | showrev-a | |
| | Kernel Architecture | | showrev-a | showrev-a | | | showrev-a | showrev-a | |
| | Application Architecture | | showrev-a | showrev-a | | | showrev-a | showrev-a | |
| | Hardware Provider | | showrev-a | showrev-a | | | showrev-a | showrev-a | |
| | Network Domain | | showrev-a | showrev-a | | | showrev-a | showrev-a | |
| | Kernel Version | | showrev-a | showrev-a | | | showrev-a | showrev-a | |
| | Openwindows Version | | vtsprobe | vtsprobe | | | vtsprobe | vtsprobe | |
| | System Clock Frequency | D | D | D | D | D | D | D | D |
| Hardware Information | Hardware Information (D) | | showrev-a | showrev-a | | | showrev-a | showrev-a | |
| | Application Architecture | | vtsprobe | vtsprobe | | | vtsprobe | vtsprobe | |
| System Board | System Board ID | ND | ND | configd | ND | ND | ND | configd | |
| | type | ND | ND | configd | ND | ND | ND | configd | |
| | State | ND | ND | configd | ND | ND | ND | configd | |
| | slot number | ND | ND | configd | ND | ND | ND | configd | |
| | temperature | ND | ND | configd | ND | ND | ND | configd | |
| | board reference number | | ND | configd | | | ND | configd | |
| Memory Controller | Memory Controller ID | D | D | configd | D | D | D | D | D |
| | memory controller model | ND | ND | configd | ND | ND | ND | ND | |
| Memory | Memory Value | | vtsprobe | configd | | | vtsprobe | configd | |
| Memory Simm | Memory Simm ID | ND | ND | configd | ND | ND | ND | configd | |
| | board reference number | ND | ND | configd | | ND | ND | configd | |
| | size | ND | ND | configd | | ND | ND | configd | |
| CPU | CPU Unit ID | | vtsprobe | configd | | | vtsprobe | configd | |
| | Clock frequency | | vtsprobe | configd | | | vtsprobe | configd | |
| | CPU model | | vtsprobe | configd | | | vtsprobe | configd | |
| | CPU dcache size | ND | ND | configd | ND | ND | ND | configd | |
| | CPU ccache size | ND | ND | configd | ND | ND | ND | configd | |
| | CPU icache size | ND | ND | configd | ND | ND | ND | configd | |
| | CPU status | ND | ND | configd | ND | ND | ND | configd | |
| EEPROM | EEPROM Model | D | D | configd | D | D | D | D | D |
| | FlashProm model | ND | ND | configd | ND | ND | ND | ND | |
| Peripheral Bus | peripheral bus id | | vtsprobe | vtsprobe | | | vtsprobe | vtsprobe | |
| | Model No | ND | ND | configd | | ND | ND | configd | |
| | Registration Number | ND | ND | configd | | ND | ND | configd | |
| Audio Port | Audio Port Id | | vtsprobe | configd | | | vtsprobe | configd | |
| Audio Port Error | Audio Port Error String | | audio-lv | audio-lv | | | audio-lv | audio-lv | |
| Parallel Port | parallel port id | | vtsprobe | configd | | | vtsprobe | configd | |
| ParallelPortError | Parallel Port Error String | | bpptest-lv | bpptest-lv | | | bpptest-lv | bpptest-lv | |

TABLE 3-continued

| Element | Element Entries | | Server | | | | Desktop | | |
|---|---|---|---|---|---|---|---|---|---|
| | | | Legacy | | | Enterprise | Legacy | | >= Ultra 2 |
| | Token Type | 5.4 | 5.5 | 5.5.1 | 5.6 | 5.4 | 5.5 | 5.5.1 | 5.6 |
| Serial Port | serial port id | | | configd | | | | configd | |
| Diskette | Diskette ID | | vtsprobe | configd | | | vtsprobe | configd | |
| | Diskette Status | ND | ND | configd | | ND | ND | configd | |
| | Diskette Type | ND | ND | configd | | ND | ND | configd | |
| Peripheral Adaptor | Peripheral Adaptor ID | | vtsprobe | configd | | | vtsprobe | configd | |
| | peripheral adaptor model name | | vtsprobe | configd | | | vtsprobe | configd | |
| | peripheral adaptor type | | vtsprobe | configd | | | vtsprobe | configd | |
| | sbus slot no | ND | ND | configd | | ND | ND | configd | |
| | speed register | ND | ND | configd | | ND | ND | configd | |
| CDROM | CDROM ID | | vtsprobe | configd | | | vtsprobe | configd | |
| Tape | TAPE ID | | vtsprobe | configd | | | vtsprobe | configd | |
| | Tape Type | | vtsprobe | configd | | | vtsprobe | configd | |
| Tape Hardware Errors | Tape HW Error String | | tapetest-lv | tapetest=lv | | | tapetest-lv | tapetest-lv | |
| SCSI Disk | SCSI Disk ID | | vtsprobe | configd | | | vtsprobe | configd | |
| | SCSI Disk Sectors per track | | vtsprobe | vtsprobe | | | vtsprobe | vtsprobe | |
| | SCSI disk firmware rev | | vtsprobe | vtsprobe | | | vtsprobe | vtsprobe | |
| | SCSI disk serial number | | vtsprobe | vtsprobe | | | vtsprobe | vtsprobe | |
| | SCSI Disk Sectors per Cylinder | | vtsprobe | vtsprobe | | | vtsprobe | vtsprobe | |
| | SCSI Disk Sun ID | | vtsprobe | vtsprobe | | | vtsprobe | vtsprobe | |
| | SCSI Disk Cylinders | | vtsprobe | vtsprobe | | | vtsprobe | vtsprobe | |
| | SCSI Disk Capacity | | vtsprobe | vtsprobe | | | vtsprobe | vtsprobe | |
| | SCSI Disk Software Controller | | vtsprobe | vtsprobe | | | vtsprobe | vtsprobe | |
| | SCSI Disk Accessible Cylinders | | vtsprobe | vtsprobe | | | vtsprobe | vtsprobe | |
| | SCSI Disk Tracks per Cylinder | | vtsprobe | vtsprobe | | | vtsprobe | vtsprobe | |
| | SCSI Disk Bytes per Sector | | vtsprobe | vtsprobe | | | vtsprobe | vtsprobe | |
| | SCSI Disk Vendor | | vtsprobe | vtsprobe | | | vtsprobe | vtsprobe | |
| SCSI Disk Error | DIsk Error String | | disktest-lv (o) | disktest-lv (o) | | | disktest-lv (o) | disktest-lv (o) | |
| SCSI Disk Partition | SCSI DIsk Partition ID | diskprobe | diskprobe | diskprobe | | diskprobe | diskprobe | diskprobe | |
| | SCSI DIsk Partition last sector | diskprobe | diskprobe | diskprobe | | diskprobe | diskprobe | diskprobe | |
| | SCSI Disk Partition Sector Count | diskprobe | diskprobe | diskprobe | | diskprobe | diskprobe | diskprobe | |
| | Scsi Disk Partition First Sector | diskprobe | diskprobe | diskprobe | | diskprobe | diskprobe | diskprobe | |
| SCSI Disk Bad Block | SCSI BAD Block ID | dmesg | dmesg | dmesg | dmesg | dmesg | dmesg | dmesg | dmesg |
| | Time occurred | dmesg | dmesg | dmesg | dmesg | dmesg | dmesg | dmesg | dmesg |
| Network Adaptor | Network Adaptator ID | | vtsprobe | configd | | | vtsprobe | configd | |
| | Internet Address | | vtsprobe | configd | | | vtsprobe | configd | |
| | sbus slot no | ND | ND | configd | | ND | ND | configd | |
| Network Hardware Error | Network HW Error String | | nettest-lv (o) | nettest-lv (o) | | | nettest-lv (o) | nettest-lv (o) | |
| Serial Optical Channel Processor Host Adaptor | Serial Optical Processor ID | ND | ND | configd | | ND | ND | configd | |
| Storage Array | Sbus slot number | ND | ND | configd | | ND | ND | configd | |
| Storage Array Disk | SO model No. | ND | ND | configd | | ND | ND | configd | |
| Storage Array Partition | | | | | | | | | |

TABLE 3-continued

| Element | Element Entries | Server | | | | | | Desktop | | |
| | | Legacy | | | Enterprise | | Legacy | | Desktop | |
| | Token Type | 5.4 | 5.5 | 5.5.1 | 5.6 | 5.4 | 5.5 | 5.5.1 | >= Ultra 2 5.6 |
|---|---|---|---|---|---|---|---|---|---|
| Graphics Adaptor | Graphics Adaptor ID | | | | | | | | |
| | graphics adaptor model no | ND | ND | configd | | ND | ND | configd | |
| | sbus slot number | ND | ND | configd | | ND | ND | configd | |
| | Monitor Dtype (D) | D | D | configd | D | D | D | configd | D |
| Monitor | | | | | | | | | |
| Serial Port Expander | | | | | | | | | |
| System Board PSU | Power Supply ID | ND | ND | | | ND | ND | ND | |
| | Power Supply Wattage | ND | ND | | | ND | ND | ND | |
| | Power Supply Status | ND | ND | | | ND | ND | ND | |
| System Power Supply | System Power Supply (D) | D | D | D | D | D | D | D | |
| Software packages & patches | Software Packages & packages (D) | D | D | D | D | D | D | D | |
| Software Package | Software Package ID | | pkginfo-l | pkginfo-l | | | pkginfo-l | pkginfo-l | |
| | Package Vendor | | pkginfo-l | pkginfo-l | | | pkginfo-l | pkginfo-l | |
| | Package Files | | pkginfo-l | pkginfo-l | | | pkginfo-l | pkginfo-l | |
| | Package Category | | pkginfo-l | pkginfo-l | | | pkginfo-l | pkginfo-l | |
| | Package Architecture | | pkginfo-l | pkginfo-l | | | pkginfo-l | pkginfo-l | |
| | Package Status | | pkginfo-l | pkginfo-l | | | pkginfo-l | pkginfo-l | |
| | Package Base Directory | | pkginfo-l | pkginfo-l | | | pkginfo-l | pkginfo-l | |
| | Package Version | | pkginfo-l | pkginfo-l | | | pkginfo-l | pkginfo-l | |
| | Package pstamp | | pkginfo-l | pkginfo-l | | | pkginfo-l | pkginfo-l | |
| | Package Installation data | | pkginfo-l | pkginfo-l | | | pkginfo-l | pkginfo-l | |
| | Package Name | | pkginfo-l | pkginfo-l | | | pkginfo-l | pkginfo-l | |
| Software Patch | Software Patch ID | showrev-p | showrev-p | showrev-p | | showrev-p | showrev-p | showrev-p | |
| | Revision ID | showrev-p | showrev-p | showrev-p | | showrev-p | showrev-p | showrev-p | |
| Operating System | Operating System ID | showrev-a | showrev-a | showrev-a | | showrev-a | showrev-a | showrev-a | |
| | OS Release Type | showrev-a | showrev-a | showrev-a | | showrev-a | showrev-a | showrev-a | |
| | OS Release Version | showrev-a | showrev-a | showrev-a | | showrev-a | showrev-a | showrev-a | |
| System Services | System Services (D) | D | D | D | D | D | D | D | D |
| Unix Filesystems | Unix Filesystems (D) | D | D | D | D | D | D | D | D |
| Local Filesystems (Boot) | Local Current Filesystem name | more/etc/ | more/etc/ | more/etc/ | more/etc/ | more/etc/ | more/etc/ | more/etc/ | more/etc/ |
| | | vfstab | vfstab | vfstab | vfstab | vfstab | vfstab | vfstab | vfstab |
| | Associative Device Name | more/etc/ | more/etc/ | more/etc/ | more/etc/ | more/etc/ | more/etc/ | more/etc/ | more/etc/ |
| | | vfstab | vfstab | vfstab | vfstab | vfstab | vfstab | vfstab | vfstab |
| | mount point | mount-v | mount-v | mount-v | mount-v | mount-v | mount-v | mount-v | mount-v |
| | | mount-v | mount-v | mount-v | mount-v | mount-v | mount-v | mount-v | mount-v |
| | FSCK pass | df-lk | df-lk | df-lk | df-lk | df-lk | df-lk | df-lk | df-lk |
| | | df-lk | df-lk | df-lk | df-lk | df-lk | df-lk | df-lk | df-lk |
| | mount options | more/etc/ | more/etc/ | more/etc/ | more/etc/ | more/etc/ | more/etc/ | more/etc/ | more/etc/ |
| | | vfstab | vfstab | vfstab | vfstab | vfstab | vfstab | vfstab | vfstab |
| Local Filesystem (Current) | Local Current Filesystem Name | mount-v | mount-v | mount-v | mount-v | mount-v | mount-v | mount-v | mount-v |
| | Associative Device Name | mount-v | mount-v | mount-v | mount-v | mount-v | mount-v | mount-v | mount-v |
| | mount point | mount-v | mount-v | mount-v | mount-v | mount-v | mount-v | mount-v | mount-v |
| | mount options | mount-v | mount-v | mount-v | mount-v | mount-v | mount-v | mount-v | mount-v |
| | Date mounted since | mount-v | mount-v | mount-v | mount-v | mount-v | mount-v | mount-v | mount-v |
| | Total Kbytes available | df-lk | df-lk | df-lk | df-lk | df-lk | df-lk | df-lk | df-lk |
| | Total Kbytes used | df-lk | df-lk | df-lk | df-lk | df-lk | df-lk | df-lk | df-lk |
| | Percentage Capacity | df-lk | df-lk | df-lk | df-lk | df-lk | df-lk | df-lk | df-lk |

TABLE 3-continued

| | | Server | | | | Desktop | | | |
|---|---|---|---|---|---|---|---|---|---|
| | | Legacy | | | | Legacy | | | |
| Element | Element Entries Token Type | 5.4 | 5.5 | 5.5.1 | Enterprise 5.6 | 5.4 | 5.5 | 5.5.1 | >= Ultra 2 5.6 |
| Cache FS | Files used | df-l | df-l | df-l | df-l | df-l | df-l | df-l | df-l |
| Cached Filesystem (Boot) | Cachefs Daerrion | ps-ef | ps-ef | ps-ef | ps-ef | ps-ef | ps-ef | ps-ef | ps-ef |
| | Cached Filesystem Id | more/etc/ vfstab | more/etc/ vfstab | more/etc/ vfstab | more/etc/ vfstab | more/etc/ vfstab | more/etc/ vfstab | more/etc/ vfstab | more/etc/ vfstab |
| | Filesystem cached | more/etc/ vfstab | more/etc/ vfstab | more/etc/ vfstab | more/etc/ vfstab | more/etc/ vfstab | more/etc/ vfstab | more/etc/ vfstab | more/etc/ vfstab |
| | mount options | more/etc/ vfstab | more/etc/ vfstab | more/etc/ vfstab | more/etc/ vfstab | more/etc/ vfstab | more/etc/ vfstab | more/etc/ vfstab | more/etc/ vfstab |
| Cached File System (Current) | Cached Filesystem ID | mount-v | mount-v | mount-v | mount-v | mount-v | mount-v | mount-v | mount-v |
| | Filesystem cached | mount-v | mount-v | mount-v | mount-v | mount-v | mount-v | mount-v | mount-v |
| | cache bits | cachefsstat | cachefsstat | cachefsstat | cachefsstat | cachefsstat | cachefsstat | cachefsstat | cachefsstat |
| | cache misses | cachefsstat | cachefsstat | cachefsstat | cachefsstat | cachefsstat | cachefsstat | cachefsstat | cachefsstat |
| | cache modifies | cachefsstat | cachefsstat | cachefsstat | cachefsstat | cachefsstat | cachefsstat | cachefsstat | cachefsstat |
| NFS Server | NFS Server exists | ps-ef | ps-ef | ps-ef | ps-ef | ps-ef | ps-ef | ps-ef | ps-ef |
| Exported Filesystem (boot) | Exported Filesystem name | more/etc/ dfs/dfstab | more/etc/ dfs/dfstab | more/etc/ dfs/dfstab | more/etc/ dfs/dfstab | more/etc/ dfs/dfstab | more/etc/ dfs/dfstab | more/etc/ dfs/dfstab | more/etc/ dfs/dfstab |
| | Export options | more/etc/ dfs/dfstab | more/etc/ dfs/dfstab | more/etc/ dfs/dfstab | more/etc/ dfs/dfstab | more/etc/ dfs/dfstab | more/etc/ dfs/dfstab | more/etc/ dfs/dfstab | more/etc/ dfs/dfstab |
| | Export Description | more/etc/ dfs/dfstab | more/etc/ dfs/dfstab | more/etc/ dfs/dfstab | more/etc/ dfs/dfstab | more/etc/ dfs/dfstab | more/etc/ dfs/dfstab | more/etc/ dfs/dfstab | more/etc/ dfs/dfstab |
| Exported Filesystem (current) | Exported filesystem name | share | share | share | share | share | share | share | share |
| | Exported file system options | share | share | share | share | share | share | share | share |
| | Exported FS description | share | share | share | share | share | share | share | share |
| NFS Client | Filesystems being mounted | ps-ef | ps-ef | ps-ef | ps-ef | ps-ef | ps-ef | ps-ef | ps-ef |
| Mounted Filesystem (Boot) | Filesystem Name | more/etc/ vfstab | more/etc/ vfstab | more/etc/ vfstab | more/etc/ vfstab | more/etc/ vfstab | more/etc/ vfstab | more/etc/ vfstab | more/etc/ vfstab |
| | remote machine | more/etc/ vfstab | more/etc/ vfstab | more/etc/ vfstab | more/etc/ vfstab | more/etc/ vfstab | more/etc/ vfstab | more/etc/ vfstab | more/etc/ vfstab |
| | remote filesystem | more/etc/ vfstab | more/etc/ vfstab | more/etc/ vfstab | more/etc/ vfstab | more/etc/ vfstab | more/etc/ vfstab | more/etc/ vfstab | more/etc/ vfstab |
| | Mount type (kerberos/NFS) | more/etc/ vfstab | more/etc/ vfstab | more/etc/ vfstab | more/etc/ vfstab | more/etc/ vfstab | more/etc/ vfstab | more/etc/ vfstab | more/etc/ vfstab |
| | mount point | more/etc/ vfstab | more/etc/ vfstab | more/etc/ vfstab | more/etc/ vfstab | more/etc/ vfstab | more/etc/ vfstab | more/etc/ vfstab | more/etc/ vfstab |
| | mount permissions | more/etc/ vfstab | more/etc/ vfstab | more/etc/ vfstab | more/etc/ vfstab | more/etc/ vfstab | more/etc/ vfstab | more/etc/ vfstab | more/etc/ vfstab |
| Mounted Filesystem (Current) | Filesystem Name | mount-v | mount-v | mount-v | mount-v | mount-v | mount-v | mount-v | mount-v |
| | Remote machine | mount-v | mount-v | mount-v | mount-v | mount-v | mount-v | mount-v | mount-v |
| | remote filesystem | mount-v | mount-v | mount-v | mount-v | mount-v | mount-v | mount-v | mount-v |
| | mount type | mount-v | mount-v | mount-v | mount-v | mount-v | mount-v | mount-v | mount-v |
| | mount point | mount-v | mount-v | mount-v | mount-v | mount-v | mount-v | mount-v | mount-v |
| | Date mounted since | mount-v | mount-v | mount-v | mount-v | mount-v | mount-v | mount-v | mount-v |
| | Total Kbytes available | df-k | df-k | df-k | df-k | df-k | df-k | df-k | df-k |
| | Total Kbytes used | df-k | df-k | df-k | df-k | df-k | df-k | df-k | df-k |
| | Percentage Capacity | df-k | df-k | df-k | df-k | df-k | df-k | df-k | df-k |
| | Files used | df | df | df | df | df | df | df | df |

TABLE 3-continued

| | Element Entries | Server | | | | | Desktop | | | |
|---|---|---|---|---|---|---|---|---|---|---|
| | | Legacy | | | | Enterprise | Legacy | | | >= Ultra 2 |
| Element | Token Type | 5.4 | 5.5 | 5.5.1 | 5.6 | | 5.4 | 5.5 | 5.5.1 | 5.6 |
| NIS Server | NIS Server in existance | ps-ef | ps-ef | ps-ef | ps-ef | | ps-ef | ps-ef | ps-ef | ps-ef |
| | domainname | showrev-a | showrev-a | showrev-a | showrev-a | | showrev-a | showrev-a | showrev-a | showrev-a |
| NIS client | NIS client software exists | ps-ef | ps-ef | ps-ef | ps-ef | | ps-ef | ps-ef | ps-ef | ps-ef |
| | domainname | showrev-a | showrev-a | showrev-a | showrev-a | | showrev-a | showrev-a | showrev-a | showrev-a |
| | Server Bound to | ypwhich | ypwhich | ypwhich | ypwhich | | ypwhich | ypwhich | ypwhich | ypwhich |
| NIS+Master | configured as NIS+Master | niscat-o | niscat-o | niscat-o | | | niscat-o | niscat-o | niscat-o | |
| | domainname | org_dir | org_dir | org_dir | | | org_dir | org_dir | org_dir | |
| | | niscat-o | niscat-o | niscat-o | | | niscat-o | niscat-o | niscat-o | |
| | | org_dir | org_dir | org_dir | | | org_dir | org_dir | org_dir | |
| | access rights | niscat-o | niscat-o | niscat-o | | | niscat-o | niscat-o | niscat-o | |
| | | org_dir | org_dir | org_dir | | | org_dir | org_dir | org_dir | |
| NIS+Replica | configured as a NIS+Replica | niscat-o | niscat-o | niscat-o | | | niscat-o | niscat-o | niscat-o | |
| | | org_dir | org_dir | org_dir | | | org_dir | org_dir | org_dir | |
| | domainname | niscat-o | niscat-o | niscat-o | | | niscat-o | niscat-o | niscat-o | |
| | | org_dir | org_dir | org_dir | | | org_dir | org_dir | org_dir | |
| | access rights | niscat-o | niscat-o | niscat-o | | | niscat-o | niscat-o | niscat-o | |
| | | org_dir | org_dir | org_dir | | | org_dir | org_dir | org_dir | |
| | NIS+Master | niscat-o | niscat-o | niscat-o | | | niscat-o | niscat-o | niscat-o | |
| | | org_dir | org_dir | org_dir | | | org_dir | org_dir | org_dir | |
| NIS+Client | configured as a NIS+client | niscat-o | niscat-o | niscat-o | | | niscat-o | niscat-o | niscat-o | |
| | | org_dir | org_dir | org_dir | | | org_dir | org_dir | org_dir | |
| | domainname | niscat-o | niscat-o | niscat-o | | | niscat-o | niscat-o | niscat-o | |
| | | org_dir | org_dir | org_dir | | | org_dir | org_dir | org_dir | |
| | NIS+Master | niscat-o | niscat-o | niscat-o | | | niscat-o | niscat-o | niscat-o | |
| | | org_dir | org_dir | org_dir | | | org_dir | org_dir | org_dir | |
| NIS+Search Path | NIS+Search Path | ps-ef | ps-ef | ps-ef | | | ps-ef | ps-ef | ps-ef | |
| DNS client | DNS being used | more/etc/ | more/etc/ | more/etc/ | | | more/etc/ | more/etc/ | more/etc/ | |
| DNS resolve hosts | DNS resolve host id | resolv.conf | resolv.conf | resolv.conf | | | resolv.conf | resolv.conf | resolv.conf | |
| NameService Configuration | String Dummy Token | D | D | D | D | | D | D | D | D |
| Password Map Resolve Type | Name Service map Resolved by | more/etc/ | more/etc/ | more/etc/ | | | more/etc/ | more/etc/ | more/etc/ | |
| | | witch.conf | witch.conf | witch.conf | | | witch.conf | witch.conf | witch.conf | |
| Group Map Resolve Type | Name Service map Resolved by | more/etc/ | more/etc/ | more/etc/ | | | more/etc/ | more/etc/ | more/etc/ | |
| | | nss- | nss- | nss- | | | nss- | nss- | nss- | |
| | | witch.conf | witch.conf | witch.conf | | | witch.conf | witch.conf | witch.conf | |
| Hosts Map Resolve Type | Name Service map resolved by | more/etc/ | more/etc/ | more/etc/ | | | more/etc/ | more/etc/ | more/etc/ | |
| | | nss- | nss- | nss- | | | nss- | nss- | nss- | |
| | | witch.conf | witch.conf | witch.conf | | | witch.conf | witch.conf | witch.conf | |
| Protocols Map Resolve Type | Name Service map resolved by | more/etc/ | more/etc/ | more/etc/ | | | more/etc/ | more/etc/ | more/etc/ | |
| | | nss- | nss- | nss- | | | nss- | nss- | nss- | |
| | | witch.conf | witch.conf | witch.conf | | | witch.conf | witch.conf | witch.conf | |
| RPC Map Resolve Type | Name Service map resolved by | more/etc/ | more/etc/ | more/etc/ | | | more/etc/ | more/etc/ | more/etc/ | |
| | | nss- | nss- | nss- | | | nss- | nss- | nss- | |
| | | witch.conf | witch.conf | witch.conf | | | witch.conf | witch.conf | witch.conf | |

TABLE 3-continued

| Element | | | Server | | | | Desktop | | |
| --- | --- | --- | --- | --- | --- | --- | --- | --- | --- |
| | | Legacy | | 5.5.1 | Enterprise | Legacy | | 5.5.1 | >= Ultra 2 |
| Element | Token Type | 5.4 | 5.5 | | 5.6 | 5.4 | 5.5 | 5.5.1 | 5.6 |
| Ethers Map Resolve Type | Name Service map resolved by | more/etc/ nss- witch.conf | more/etc/ nss- witch.conf | more/etc/ nss- witch.conf | | more/etc/ nss- witch.conf | more/etc/ nss- witch.conf | more/etc/ nss- witch.conf | |
| Netmasks Map Resolve Type | Name Service map Resolved by | more/etc/ nss- witch.conf | more/etc/ nss- witch.conf | more/etc/ nss- witch.conf | | more/etc/ nss- witch.conf | more/etc/ nss- witch.conf | more/etc/ nss- witch.conf | |
| bootparams Map Resolve Type | Name Service map Resolved by | more/etc/ nss- witch.conf | more/etc/ nss- witch.conf | more/etc/ nss- witch.conf | | more/etc/ nss- witch.conf | more/etc/ nss- witch.conf | more/etc/ nss- witch.conf | |
| publickey Map Resolve Type | Name Service map Resolved by | more/etc/ nss- witch.conf | more/etc/ nss- witch.conf | more/etc/ nss- witch.conf | | more/etc/ nss- witch.conf | more/etc/ nss- witch.conf | more/etc/ nss- witch.conf | |
| netgroup Map Resolve Type | Name Service Map Resolved by | more/etc/ nss- witch.conf | more/etc/ nss- witch.conf | more/etc/ nss- witch.conf | | more/etc/ nss- witch.conf | more/etc/ nss- witch.conf | more/etc/ nss- witch.conf | |
| automount Map resolve Type | Name Service Map Resolved by | more/etc/ nss- witch.conf | more/etc/ nss- witch.conf | more/etc/ nss- witch.conf | | more/etc/ nss- witch.conf | more/etc/ nss- witch.conf | more/etc/ nss- witch.conf | |
| aliases Map resolve Type | Name Service Map Resolved by | more/etc/ nss- witch.conf | more/etc/ nss- witch.conf | more/etc/ nss- witch.conf | | more/etc/ nss- witch.conf | more/etc/ nss- witch.conf | more/etc/ nss- witch.conf | |
| services Map resolve Type | Name Service Map Resolved by | more/etc/ nss- witch.conf | more/etc/ nss- witch.conf | more/etc/ nss- witch.conf | | more/etc/ nss- witch.conf | more/etc/ nss- witch.conf | more/etc/ nss- witch.conf | |
| sebdmailvars resolve Type | Name Service Map Resolved By | more/etc/ nss- witch.conf | more/etc/ nss- witch.conf | more/etc/ nss- witch.conf | | more/etc/ nss- witch.conf | more/etc/ nss- witch.conf | more/etc/ nss- witch.conf | |
| CRON | cron is running | ps-ef | ps-ef | ps-ef | ps-ef | ps-ef | ps-ef | ps-ef | ps-ef |
| root cronjob | cronjob name | crontab-1 | crontab-1 | crontab-1 | crontab-1 | crontab-1 | crontab-1 | crontab-1 | crontab-1 |
| | cronjob time control-string | crontab-1 | crontab-1 | crontab-1 | crontab-1 | crontab-1 | crontab-1 | crontab-1 | crontab-1 |
| | cronjob execution string | crontab-1 | crontab-1 | crontab-1 | crontab-1 | crontab-1 | crontab-1 | crontab-1 | crontab-1 |
| Sendmail | sendmail is running | ps-ef | ps-ef | ps-ef | ps-ef | ps-ef | ps-ef | ps-ef | ps-ef |
| | major relay mailer | more/etc/ mail/send- mai.cf | more/etc/ mail/send- mai.cf | more/etc/ mail/send- mai.cf | more/etc/ mail/send- mai.cf | more/etc/ mail/send- mai.cf | more/etc/ mail/send- mai.cf | more/etc/ mail/send- mai.cf | more/etc/ mail/send- mai.cf |
| | major relay host (DR) | more/etc/ mail/send- mai.cf | more/etc/ mail/send- mai.cf | more/etc/ mail/send- mai.cf | more/etc/ mail/send- mai.cf | more/etc/ mail/send- mai.cf | more/etc/ mail/send- mai.cf | more/etc/ mail/send- mai.cf | more/etc/ mail/send- mai.cf |
| | major relay host (CR) | more/etc/ mail/send- mai.cf | more/etc/ mail/send- mai.cf | more/etc/ mail/send- mai.cf | more/etc/ mail/send- mai.cf | more/etc/ mail/send- mai.cf | more/etc/ mail/send- mai.cf | more/etc/ mail/send- mai.cf | more/etc/ mail/send- mai.cf |
| TCP/IP | Name of Ethernet board | | | | | | | | |
| | Internet Address | showrev-a | vtsprobe showrev-a | configd showrev-a | showrev-a | showrev-a | vtsprobe showrev-a | configd showrev-a | showrev-a |
| | Dummy Token | D | D | D | D | D | D | D | D |
| Routing Table | Network Route Destination | netstat-r | netstat-r | netstat-r | netstat-r | netstat-r | netstat-r | netstat-r | netstat-r |
| Network Route | Gateway | netstat-r | netstat-r | netstat-r | netstat-r | netstat-r | netstat-r | netstat-r | netstat-r |

TABLE 3-continued

| | Element Entries | Server | | | | Desktop | | |
|---|---|---|---|---|---|---|---|---|
| | | Legacy | | | Enterprise | Legacy | | >= Ultra 2 |
| Element | Token Type | 5.4 | 5.5 | 5.5.1 | 5.6 | 5.5 | 5.5.1 | 5.6 |
| Network Known host list | Flags | netstat-r | netstat-r | netstat-r | netstat-r | netstat-r | netstat-r | netstat-r |
| Network Known host | use | netstat-r | netstat-r | netstat-r | netstat-r | netstat-r | netstat-r | netstat-r |
|  | Dummy Token | D | D | D | D | D | D | D |
|  | Known IP address | arp-a | arp-a | arp-a | arp-a | arp-a | arp-a | arp-a |
|  | Network Mask | arp-a | arp-a | arp-a | arp-a | arp-a | arp-a | arp-a |
|  | Physical Address | arp-a | arp-a | arp-a | arp-a | arp-a | arp-a | arp-a |
| Javastation boot list | | | | | | | | |
| Javastation | | | | | | | | |
| Volume manager | Create if running | ps-ef | ps-ef | ps-ef | ps-ef | ps-ef | ps-ef | ps-ef |
| Kernel | Kernel Architecture | showrev-a | showrev-a | showrev-a | showrev-a | showrev-a | showrev-a | showrev-a |
|  | Kernel memory | | vtsprobe | vtsprobe | | vtsprobe | vtsprobe | |
| Kernel Memory Leak | Value leaked | | kmemleak | kmemleak | | kmemleak | kmemleak | |
| Kernel module list | Dummy Token | D | D | D | D | D | D | D |
| kernel module | Kernel Module Name | modinfo | modinfo | modinfo | modinfo | modinfo | modinfo | modinfo |
|  | Kernel Module Load address | modinfo | modinfo | modinfo | modinfo | modinfo | modinfo | modinfo |
|  | Kernel Module Info | modinfo | modinfo | modinfo | modinfo | modinfo | modinfo | modinfo |
|  | Kernel Module Revision | modinfo | modinfo | modinfo | modinfo | modinfo | modinfo | modinfo |
| kernel statistics | dummy Token | D | D | D | D | D | D | D |
| VMHAT | dummy token | D | D | D | D | D | D | D |
|  | VH CTX Free | | netstat-k | netstat-k | | netstat-k | netstat-k | |
|  | VH CTX Dirty | | netstat-k | netstat-k | | netstat-k | netstat-k | |
|  | VH CTX steal | | netstat-k | netstat-k | | netstat-k | netstat-k | |
|  | VH TTE load | | netstat-k | netstat-k | | netstat-k | netstat-k | |
|  | VH page faults | | netstat-k | netstat-k | | netstat-k | netstat-k | |
|  | VH steal count | | netstat-k | netstat-k | | netstat-k | netstat-k | |
| Segment map | Dummy text | D | D | D | D | D | D | D |
|  | Faults | | netstat-k | netstat-k | | netstat-k | netstat-k | |
|  | Faults | | netstat-k | netstat-k | | netstat-k | netstat-k | |
|  | getmap | | netstat-k | netstat-k | | netstat-k | netstat-k | |
|  | Page Create | | netstat-k | netstat-k | | netstat-k | netstat-k | |
| Buffer IO | Dummy Token | D | D | D | D | D | D | D |
|  | Buffer Cache Lookups | | netstat-k | netstat-k | | netstat-k | netstat-k | |
|  | Buffer Cache bits | | netstat-k | netstat-k | | netstat-k | netstat-k | |
|  | Waits for Buffer Allocations | | netstat-k | netstat-k | | netstat-k | netstat-k | |
|  | Duplicate Buffers found | | netstat-k | netstat-k | | netstat-k | netstat-k | |
| System pages | Dummy Token | D | D | D | D | D | D | D |
|  | Physical Memory | | netstat-k | netstat-k | | netstat-k | netstat-k | |
|  | Inalloc | | netstat-k | netstat-k | | netstat-k | netstat-k | |
|  | nFree | | netstat-k | netstat-k | | netstat-k | netstat-k | |
|  | kernel base | | netstat-k | netstat-k | | netstat-k | netstat-k | |
|  | econtig | | netstat-k | netstat-k | | netstat-k | netstat-k | |
|  | free memory | | netstat-k | netstat-k | | netstat-k | netstat-k | |
|  | available rmem | | netstat-k | netstat-k | | netstat-k | netstat-k | |
|  | pages free | | netstat-k | netstat-k | | netstat-k | netstat-k | |
|  | pages locked | | netstat-k | netstat-k | | netstat-k | netstat-k | |
| RPC CLTS Client | Dummy Token | D | D | D | D | D | D | D |

TABLE 3-continued

| Element | Element Entries Token Type | Server Legacy 5.4 | Server Legacy 5.5 | Server 5.5.1 | Server Enterprise 5.6 | Desktop 5.4 | Desktop Legacy 5.5 | Desktop 5.5.1 | Desktop >= Ultra 2 5.6 |
|---|---|---|---|---|---|---|---|---|---|
| | Calls | | netstat-k | netstat-k | | | netstat-k | netstat-k | |
| | Badcalls | | netstat-k | netstat-k | | | netstat-k | netstat-k | |
| | badxids | | netstat-k | netstat-k | | | netstat-k | netstat-k | |
| | timeouts | | netstat-k | netstat-k | | | netstat-k | netstat-k | |
| RPC COTS Client | Dummy Token | D | | D | D | | | D | D |
| | Calls | | netstat-k | netstat-k | | | netstat-k | netstat-k | |
| | badcalls | | netstat-k | netstat-k | | | netstat-k | netstat-k | |
| | badxids | | netstat-k | netstat-k | | | netstat-k | netstat-k | |
| | interrupts | | netstat-k | netstat-k | | | netstat-k | netstat-k | |
| RPC COTS Connections | Dummy Token | D | | D | D | | | D | D |
| | Write Queue | | netstat-k | netstat-k | | | netstat-k | netstat-k | |
| | Server | | netstat-k | netstat-k | | | netstat-k | netstat-k | |
| | status | | netstat-k | netstat-k | | | netstat-k | netstat-k | |
| RPC Client | Dummy Token | D | | D | D | | | D | D |
| | calls | | netstat-k | netstat-k | | | netstat-k | netstat-k | |
| | badcalls | | netstat-k | netstat-k | | | netstat-k | netstat-k | |
| | re transmits | | netstat-k | netstat-k | | | netstat-k | netstat-k | |
| | badxids | | netstat-k | netstat-k | | | netstat-k | netstat-k | |
| | can't send | | netstat-k | netstat-k | | | netstat-k | netstat-k | |
| RPC CLTS Server | Dummy Token | D | | D | D | | | D | D |
| | Calls | | netstat-k | netstat-k | | | netstat-k | netstat-k | |
| | badcalls | | netstat-k | netstat-k | | | netstat-k | netstat-k | |
| | xdr call | | netstat-k | netstat-k | | | netstat-k | netstat-k | |
| RPC COTS Server | Dummy Token | D | | D | D | | | D | D |
| | calls | | netstat-k | netstat-k | | | netstat-k | netstat-k | |
| | badcalls | | netstat-k | netstat-k | | | netstat-k | netstat-k | |
| | xdr call | | netstat-k | netstat-k | | | netstat-k | netstat-k | |
| RPC Server | Dummy Token | D | | D | D | | | D | D |
| | calls | | netstat-k | netstat-k | | | netstat-k | netstat-k | |
| | bad calls | | netstat-k | netstat-k | | | netstat-k | netstat-k | |
| | xdr calls | | netstat-k | netstat-k | | | netstat-k | netstat-k | |
| Inode cache | Dummy Token | D | | D | D | | | D | D |
| | size | | netstat-k | netstat-k | | | netstat-k | netstat-k | |
| | maxsize | | netstat-k | netstat-k | | | netstat-k | netstat-k | |
| | hits | | netstat-k | netstat-k | | | netstat-k | netstat-k | |
| | misses | | netstat-k | netstat-k | | | netstat-k | netstat-k | |
| | mallocs | | netstat-k | netstat-k | | | netstat-k | netstat-k | |
| Kernel Mmory magazine | Magazine ID | | netstat-k | netstat-k | | | netstat-k | netstat-k | |
| | Buffer Size | | netstat-k | netstat-k | | | netstat-k | netstat-k | |
| | buffer available | | netstat-k | netstat-k | | | netstat-k | netstat-k | |
| | alloc fail | | netstat-k | netstat-k | | | netstat-k | netstat-k | |
| kernel memory buffer control cache | Dummy Token Buffer Size | D | | D | D netstat-k | | | D | D |
| | buffer available | | netstat-k | netstat-k | | | netstat-k | netstat-k | |
| kernel memory allocation | Kernel memory allocation ID | | netstat-k | netstat-k | | | netstat-k | netstat-k | |
| | Buffer Available | | netstat-k | netstat-k | | | netstat-k | netstat-k | |

TABLE 3-continued

| | | Server | | | | Desktop | | | |
|---|---|---|---|---|---|---|---|---|---|
| | | Legacy | | | Enterprise | | Legacy | | >= Ultra 2 |
| Element | Token Type | 5.4 | 5.5 | 5.5.1 | 5.6 | 5.4 | 5.5 | 5.5.1 | 5.6 |
| SFMMU Cache | buffer size | | netstat-k | netstat-k | | | netstat-k | netstat-k | |
| | buffer total | | netstat-k | netstat-k | | | netstat-k | netstat-k | |
| | SFMMU Cache ID | | netstat-k | netstat-k | | | netstat-k | netstat-k | |
| | Buffer Available | | netstat-k | netstat-k | | | netstat-k | netstat-k | |
| | Failed Allocations | | netstat-k | netstat-k | | | netstat-k | netstat-k | |
| Segment Cache | Dummy Token | | netstat-k | netstat-k | | | netstat-k | netstat-k | |
| | Buffer Available | | netstat-k | netstat-k | | | netstat-k | netstat-k | |
| | Failed Allocations | | netstat-k | netstat-k | | | netstat-k | netstat-k | |
| Thread Cache | Dummy Token | D | D | D | D | | D | D | D |
| | buffer available | | netstat-k | netstat-k | | | netstat-k | netstat-k | |
| | Failed Allocations | | netstat-k | netstat-k | | | netstat-k | netstat-k | |
| Leight Weight Process Cache | Dummy Token | D | D | D | D | | D | D | D |
| | buffer available | | netstat-k | netstat-k | | | netstat-k | netstat-k | |
| | Failed Allocations | | netstat-k | netstat-k | | | netstat-k | netstat-k | |
| CRED Cache | Dummy Token | D | D | D | D | | D | D | D |
| | buffer available | netstat-k | netstat-k | netstat-k | | netstat-k | netstat-k | netstat-k | |
| | Failed Allocations | | netstat-k | netstat-k | | | netstat-k | netstat-k | |
| Thread Cache | Dummy Token | D | D | D | D | | D | D | D |
| | buffer available | | netstat-k | netstat-k | | | netstat-k | netstat-k | |
| | Failed Allocations | | netstat-k | netstat-k | | | netstat-k | netstat-k | |
| | global allocations | | netstat-k | netstat-k | | | netstat-k | netstat-k | |
| Steams Message | Steam Message ID | | netstat-k | netstat-k | | | netstat-k | netstat-k | |
| | Buffer Available | | netstat-k | netstat-k | | | netstat-k | netstat-k | |
| | Allocation Failures | | netstat-k | netstat-k | | | netstat-k | netstat-k | |
| Stream Head Cache | Dummy Data | D | D | D | D | | D | D | D |
| | Buffer Available | | netstat-k | netstat-k | | | netstat-k | netstat-k | |
| | Allocation Failures | | netstat-k | netstat-k | | | netstat-k | netstat-k | |
| Queue Cache | Dummy Data | D | D | D | D | | D | D | D |
| | Buffer Available | | netstat-k | netstat-k | | | netstat-k | netstat-k | |
| | Allocation Failures | | netstat-k | netstat-k | | | netstat-k | netstat-k | |
| Sync Q Cache | Dummy Data | D | D | D | D | | D | D | D |
| | Buffer Available | | netstat-k | netstat-k | | | netstat-k | netstat-k | |
| | Allocation Failures | | netstat-k | netstat-k | | | netstat-k | netstat-k | |
| Streams Message | Dummy Data | D | D | D | D | | D | D | D |
| | Buffer Available | | netstat-k | netstat-k | | | netstat-k | netstat-k | |
| | Allocation Failures | | netstat-k | netstat-k | | | netstat-k | netstat-k | |
| anonymous Cache | Dummy Data | D | D | D | D | | D | D | D |
| | Buffer Available | | netstat-k | netstat-k | | | netstat-k | netstat-k | |
| | Allocation Failures | | netstat-k | netstat-k | | | netstat-k | netstat-k | |
| anonymous map Cache | Dummy Data | D | D | D | D | | D | D | D |
| | Buffer Available | | netstat-k | netstat-k | | | netstat-k | netstat-k | |
| | Allocation Failures | | netstat-k | netstat-k | | | netstat-k | netstat-k | |
| seg VN Cache | Dummy Data | D | D | D | D | | D | D | D |
| | Buffer Available | | netstat-k | netstat-k | | | netstat-k | netstat-k | |
| | Allocation Failures | | netstat-k | netstat-k | | | netstat-k | netstat-k | |
| UFS InodeCache | Dummy Data | D | D | D | D | | D | D | D |

TABLE 3-continued

| Element | Element Entries | | Server | | | | Desktop | | |
| | | | Legacy | | | Enterprise | Legacy | | >= Ultra 2 |
| | Token Type | 5.4 | 5.5 | 5.5.1 | 5.6 | 5.4 | 5.5 | 5.5.1 | 5.6 |
|---|---|---|---|---|---|---|---|---|---|
| | Buffer Available | | netstat-k | netstat-k | | | netstat-k | netstat-k | |
| | Allocation Failures | | netstat-k | netstat-k | | | netstat-k | netstat-k | |
| FASCache | Dummy Data | D | D | D | D | D | D | D | D |
| | Buffer Available | | netstat-k | netstat-k | | | netstat-k | netstat-k | |
| | Allocation Failures | | netstat-k | netstat-k | | | netstat-k | netstat-k | |
| PipeCache | Dummy Data | D | D | D | D | D | D | D | D |
| | Buffer Available | | netstat-k | netstat-k | | | netstat-k | netstat-k | |
| | Allocation Failures | | netstat-k | netstat-k | | | netstat-k | netstat-k | |
| LM sysid | Dummy Data | D | D | D | D | D | D | D | D |
| | Buffer Available | | netstat-k | netstat-k | | | netstat-k | netstat-k | |
| | Allocation Failures | | netstat-k | netstat-k | | | netstat-k | netstat-k | |
| LM client | Dummy Data | D | D | D | D | D | D | D | D |
| | Buffer Available | | netstat-k | netstat-k | | | netstat-k | netstat-k | |
| | Allocation Failures | | netstat-k | netstat-k | | | netstat-k | netstat-k | |
| Virtual Memory | Total Virtual Memory size | vmstat | vtsprobe | vtsprobe | | vmstat | vtsprobe | vtsprobe | |
| | Virtual Memory Free | vmstat | vmstat | vmstat | | vmstat | vmstat | vmstat | |
| Page Fault | Page fault id | vmstat | vmstat | vmstat | | | vmstat | vmstat | |
| Windowing System | Windowing system revision | showrev-a | showrev-a | showrev-a | | showrev-a | showrev-a | showrev-a | |
| | Display Size | xdpyinfo | zdpyinfo | zdpyinfo | | zdpyinfo | zdpyinfo | xdpyinfo | |
| | Depth of root window | xdpyinfo | xdpyinfo | xdpyinfo | | xdpyinfo | xdpyinfo | xdpyinfo | |
| | resolution | xdpyinfo | xdpyinfo | xdpyinfo | | xdpyinfo | xdpyinfo | xdpyinfo | |
| Process Table | Dummy Token | D | D | D | D | D | D | D | D |
| Process | process name | ps-ef | ps-ef | ps-ef | ps-ef | ps-ef | ps-ef | ps-ef | ps-ef |
| | time | ps-ef | ps-ef | ps-ef | ps-ef | ps-ef | ps-ef | ps-ef | ps-ef |
| | process id | ps-ef | ps-ef | ps-ef | ps-ef | ps-ef | ps-ef | ps-ef | ps-ef |
| | parent id | ps-ef | ps-ef | ps-ef | ps-ef | ps-ef | ps-ef | ps-ef | ps-ef |
| Unbundled Software | Dummy Token | D | D | D | D | D | D | D | D |
| Solstice DiskSuite | | | | | | | | | |
| MetaDisk Partition | | | | | | | | | |
| Solstice Backup partition | Solstice Backup | | | | | | | | |
| Solstice Symon | installed | ND | ND | pkginfo-1 | pkginfo-1 | ND | ND | pkginfo-1 | pkginfo-1 |
| | Symond running | ND | ND | ps-ef | ps-ef | ND | ND | ps-ef | ps-ef |
| | Kernel reader running | ND | ND | ps-ef | ps-ef | ND | ND | ps-ef | ps-ef |
| | Log scanner running | ND | ND | ps-ef | ps-ef | ND | ND | ps-ef | ps-ef |
| Sybase | Sybase datasrver running | ps-ef | ps-ef | ps-ef | ps-ef | ps-ef | ps-ef | ps-ef | ps-ef |
| | sybase backup dataserver running | ps-ef | ps-ef | ps-ef | ps-ef | ps-ef | ps-ef | ps-ef | ps-ef |
| Oracle | Oracel server running | ps-ef | ps-ef | ps-ef | ps-ef | ps-ef | ps-ef | ps-ef | ps-ef |
| Informix | Informix server running | ps-ef | ps-ef | ps-ef | ps-ef | ps-ef | ps-ef | ps-ef | ps-ef |
| SAP | | | | | | | | | |

Key:
(D) — Dummy Token
(ND) — No data available
(M) — Output of test must be modified as it is different across OS releases
*Blank spaces means untested or unknown tests.

What is claimed is:

1. A method comprising:

providing a host state representing a state of a computer system, the host state being represented as a modifiable tree structure including elements in a fixed hierarchical relationship, the elements being given value by associated tokens, the elements and associated tokens representing hardware and software components of the computer system and wherein the tokens are extracted from diagnostic data from the computer system;

determining if predetermined conditions exist in the computer system by comparing respective definitions of the predetermined conditions to the host state; and generating an alert if one of the predetermined conditions is determined to exist.

2. The method as recited in claim 1 wherein each of the definitions is an alert definition defining a respective state of aspects of the computer system hardware and software.

3. The method as recited in claim 2 wherein at least one of the alert definitions generates an alert according to at least one token value.

4. The method as recited in claim 2 wherein at least one of the alert definitions generates an alert according to a value of at least one other alert.

5. The method as recited in claim 1 wherein the computer system is remote from a monitoring computer system on which the host state is provided.

6. The method as recited in claim 1 further comprising:

providing a plurality of host states representing the computer system, each of the host states representing the state of the computer system over a different time period;

extracting at least one token value from each of a number of said host states; and comparing the extracted token values from said number of host states to the conditions defined in the definitions, thereby monitoring conditions existing in the computer system over time.

7. A method comprising:

providing a modifiable static tree structure representing a general computer system;

extracting component information indicating hardware and software components of the computer system, from diagnostic data of the computer system;

generating a host state, representing a state of a computer system, according to the static tree structure and the component information, wherein the static tree structure includes element types in a fixed hierarchical relationship, the element types representing the hardware and software components of the computer system;

determining if predetermined conditions exist in the computer system by comparing respective definitions of the predetermined conditions to the host state; and generating an alert if one of the predetermined conditions is determined to exist.

8. The method as recited in claim 7 further comprising extracting the component information as a plurality of tokens, the tokens being respective instances of respective token types, each of the token types having a value of one aspect of the component information and an indication of an association with one of the elements in the static tree.

9. The method as recited in claim 7 wherein the computer system is part of a first computer system and the diagnostic data is communicated from the first computer system to a second computer system, the second computer system being remote from the first computer system, the second computer rebuilding the state of the computer system.

10. A monitoring computer system for generating alerts indicating predetermined conditions exist in a monitored computer system, comprising:

a first data storage area storing a plurality of alert definitions defining respective predetermined conditions in the monitored computer system;

a second data storage area storing at least a first host state of the monitored computer system, the first host state being represented as a modifiable tree structure including elements in a fixed hierarchical relationship, the elements being given value by associated token values indicating respective software and hardware components of the monitored computer system; and a monitoring computer, coupled to the first and second data storage areas; and wherein the monitoring computer generates alerts when a condition defined in one of the alert definitions is determined to be present in the first host state.

11. The monitoring computer as recited in claim 10 wherein the first host state is represented as a tree structure including elements in a fixed hierarchical relationship, the elements being given value by associated tokens, the elements and associated tokens representing hardware and software components of the computer system and wherein the tokens are extracted from diagnostic data provided from the monitored computer system.

12. The monitoring computer as recited in claim 10 wherein the monitored computer system is remotely located from the monitoring computer system and wherein the diagnostic data is provided from the remotely located monitored computer system to the monitoring computer system.

13. The monitoring computer system as recited in claim 11 further comprising a third data storage area coupled to the monitoring computer, the third data storage area storing a plurality of host states representing the monitored computer system, the plurality of host states in addition to the first host state, each of the first and plurality of host states representing the state of the monitored computer system over a different period of time.

14. The monitoring computer system as recited in claim 13 wherein at least one of the alert definitions defines an alert in terms of a value of tokens over time, the value of tokens over time being obtained from the first host state and the plurality of host states.

15. The monitoring computer system as recited in claim 13 wherein at least one of the alert definitions defines a spot alert in terms data stored only in the first host state, the first host state being the latest in time.

16. A computer program stored in computer readable media and operable on a monitoring computer system to evaluate the state of a monitored computer system, the computer program:

comparing a plurality of alert definitions, defining predetermined conditions existing on a computer system, to at least one host state representing a state of a computer system, wherein the host state is represented as a tree structure including elements in a modifiable hierarchical relationship, the elements being given value by associated tokens, the elements and associated tokens representing hardware and software components of the computer system and wherein the tokens are extracted from diagnostic data from the computer system;

generating an alert if the conditions defined in one of the alert definitions exists in the host state.

17. The computer program as recited in claim 16 wherein each generated alert provides an associated severity level, thereby indicating seriousness of a problem detected by the respective alert.

18. The computer program as recited in claim 16 further including an alert definition generating an alert according to data contained in the latest host state, the data being contained in at least one token.

19. The computer program as recited in claim 16 further comprising a predictive alert definition, the predictive alert definition defining a condition based on data contained in a plurality of host states, each of the host states representing the state of the computer system over a different time period.

20. The computer program as recited in claim 19 wherein the predictive alert is based upon a rate of change of the data contained in the plurality of host states.

* * * * *